(12) United States Patent
Gutt et al.

(10) Patent No.: US 12,267,147 B2
(45) Date of Patent: Apr. 1, 2025

(54) LOW COST, SIZE, WEIGHT, AND POWER (CSWAP) GEOLOCATION CAPABILITY UTILIZING SIGNAL CHARACTERISTICS PASSED THROUGH TO BACKHAUL NETWORK

(71) Applicant: Satelles, Inc., Reston, VA (US)

(72) Inventors: Gregory M. Gutt, Herndon, VA (US); Tim Flynn, New York, NY (US); David G. Lawrence, Santa Clara, CA (US); Trevor Landon, Vienna, VA (US); Maynard Porter, Haymarket, VA (US)

(73) Assignee: SATELLES, INC., Reston, VA (US)

( * ) Notice: Subject to any disclaimer, the term of this patent is extended or adjusted under 35 U.S.C. 154(b) by 258 days.

(21) Appl. No.: 17/841,520

(22) Filed: Jun. 15, 2022

(65) Prior Publication Data
US 2023/0412263 A1 Dec. 21, 2023

(51) Int. Cl.
*H04B 7/195* (2006.01)
*H04B 7/08* (2006.01)
*H04B 7/204* (2006.01)
*H04B 7/26* (2006.01)

(52) U.S. Cl.
CPC ............. *H04B 7/195* (2013.01); *H04B 7/086* (2013.01); *H04B 7/2048* (2013.01); *H04B 7/2656* (2013.01)

(58) Field of Classification Search
CPC ........ H04B 7/0413; H04B 7/15; H04B 7/185; H04B 7/18502; H04B 7/1851; H04B 7/1853; H04B 7/195; H04B 7/204; H04B 7/2656
See application file for complete search history.

(56) References Cited

U.S. PATENT DOCUMENTS

| | | | | |
|---|---|---|---|---|
| 9,494,692 | B2 * | 11/2016 | Leclercq | G01S 19/34 |
| 11,317,415 | B2 * | 4/2022 | Khoryaev | H04W 72/51 |
| 2013/0012226 | A1 * | 1/2013 | Leclercq | H04W 64/006 455/456.1 |

(Continued)

FOREIGN PATENT DOCUMENTS

| | | | | |
|---|---|---|---|---|
| CA | 2975448 A1 * | 8/2016 | | G01S 11/02 |
| CA | 3076387 A1 * | 9/2018 | | H04B 7/18513 |

(Continued)

*Primary Examiner* — Myron Wyche
(74) *Attorney, Agent, or Firm* — Polsinelli

(57) ABSTRACT

Aspects of the disclosure relate to a method for determining a location of a first device. The method comprises receiving, by the first device, at least one first signal from at least one second device. The method further comprises determining, by the first device, estimated first signal properties of at least one first signal. Also, the method comprises generating, by the first device, at least one second signal based on at least a portion of the estimated first signal properties. Further, the method comprises transmitting, by the first device, at least one second signal to at least one third device. In one or more embodiments, estimated second signal properties of at least one second signal are determined by at least one third device. In at least one embodiment, the location of the first device is determined by utilizing at least a portion of the estimated second signal properties.

42 Claims, 13 Drawing Sheets

(56) References Cited

U.S. PATENT DOCUMENTS

2022/0124667 A1* 4/2022 Chen .................. G01S 5/02521
2022/0216896 A1* 7/2022 Speidel ................. H04B 7/043

FOREIGN PATENT DOCUMENTS

| EP | 0845874 A2 * | 3/1998 | ............. H04B 7/185 |
| EP | 3675386 A1 * | 7/2020 | ............... H04B 1/00 |
| WO | WO-9802762 A2 * | 1/1998 | ............. G01S 1/022 |
| WO | WO-9927660 A1 * | 6/1999 | ............. G01S 19/29 |
| WO | WO-2021163040 A1 * | 8/2021 | ............... G01S 1/06 |

* cited by examiner

410:

$$\text{Doppler}_B = \frac{\left(f_B + \frac{f_A \dot{R}_A}{c}\right) R_B}{c}$$

$$c(TR_{X_B} - TT_{X_A} - d_{RT}) = R_A + R_B$$

420:

$$R_A = \sqrt{(x_T - x_A)^2 + (y_T - y_A)^2 + (z_T - z_A)^2} = c\,\Delta t_{RA} = c(TR_{XA} - TT_{XA})$$

$$R_B = \sqrt{(x_T - x_B)^2 + (y_T - y_B)^2 + (z_T - z_B)^2} = c\,\Delta t_{RB} = c(TR_{XB} - TT_{XB})$$

$$\dot{R}_A = \frac{(x_T - x_A)(V_{x_T} - V_{x_A}) + (y_T - y_A)(V_{y_T} - V_{y_A}) + (z_T - z_A)(V_{z_T} - V_{z_A})}{R_A}$$

$$\dot{R}_B = \frac{(x_T - x_B)(V_{x_T} - V_{x_B}) + (y_T - y_B)(V_{y_T} - V_{y_B}) + (z_T - z_B)(V_{z_T} - V_{z_B})}{R_B}$$

$$\text{Doppler}_A = f_A \left(\frac{V_{RA}}{c}\right) = \frac{f_A \dot{R}_A}{c}$$

$$\text{Doppler}_B = (f_B + \text{Doppler}_A)\left(\frac{V_{RB}}{c}\right) = \frac{(f_B + \text{Doppler}_A)\dot{R}_B}{c}$$

FIG. 4

LOW COST, SIZE, WEIGHT, AND POWER (CSWAP) GEOLOCATION CAPABILITY UTILIZING SIGNAL CHARACTERISTICS PASSED THROUGH TO BACKHAUL NETWORK

FIELD

The present disclosure relates generally to positioning, navigation, and timing (PNT), including geolocation. For example, aspects of the present disclosure relate to a low cost, size, weight, and power (CSWAP) geolocation capability that utilizes signal characteristics passed through to a backhaul network. In one or more examples, aspects of the present disclosure more specifically relate to CSWAP optimization for transceivers (e.g., beacons) that may be employed for tagging, tracking, locating, and/or navigation missions, use cases, and/or applications.

BACKGROUND

Historically, the geolocation of transceivers, which in some cases may herein be referred to as beacons, has been hamstrung by the need to use one or more of the traditional Global Navigation Satellite Systems (GNSSs), such as the Global Positioning System (GPS) and the Galileo European Global Navigation Satellite System. The traditional Global Navigation Satellite System (GNSS) constellations are located in the Medium Earth Orbit (MEO), which has an altitude between 2,000 kilometers (km) and 35,786 km above sea level on Earth. Since these MEO satellites are located so far away from Earth and utilize continuous wave (CW) signals, signals transmitted from these satellites have a very weak signal strength as seen on Earth. This weak signal strength makes it difficult for receivers and/or transceivers on Earth to detect these signals in attenuated environments, which may be caused by inclement weather, forest canopies, manmade structures (e.g., indoor environments), jamming, and so forth. Additionally, the traditional GNSS constellations require signals transmitted from four separate satellites to enable calculation of a PNT solution. These traditional geolocation capabilities have steered away from utilizing signal characteristics, such as Doppler, to determine the position of a transceiver (e.g., a beacon). This, in large part, is due to the relatively slow moving MEO based GNSS constellations, where the change in Doppler over time is not significant enough to assist in deriving meaningful and timely PNT information. In light of the foregoing, there is a need for an improved design for geolocation of transceivers (e.g., beacons).

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, apparatuses, methods, and computer-readable media for a low CSWAP geolocation capability that utilizes signal characteristics passed through a backhaul network. In one or more embodiments, a method for determining a location of a first device (e.g., a beacon device, such as beacon device 130 of FIG. 1) comprises receiving, by the first device, at least one first signal (e.g., an original signal, such as original signal 120 of FIG. 1), comprising first signal properties, from at least one second device (e.g., an originating transmitter, such as originating transmitter 110 of FIG. 1). The method further comprises determining, by the first device, estimated first signal properties of at least one first signal by measuring the first signal properties of at least one first signal. Also, the method comprises generating, by the first device, at least one second signal (e.g., a beacon signal, such as beacon signal 140 of FIG. 1), which comprises second signal properties, based on at least a portion of the estimated first signal properties. Further, the method comprises transmitting, by the first device, at least one second signal to at least one third device (e.g., a monitoring receiver, such as monitoring receiver 150 of FIG. 1). In one or more embodiments, estimated second signal properties of at least one second signal are determined by at least one third device measuring the second signal properties of at least one second signal. In at least one embodiment, the location of the first device is determined by utilizing at least a portion of the estimated second signal properties.

In one or more embodiments, the location of the first device is determined by further utilizing a time of transmission of each of at least one first signal, and utilizing a location and velocity of each of at least one second device at the time of transmission of at least one first signal.

In at least one embodiment, the first device is a beacon device. In one or more embodiments, each of at least one second device is a transmitter device or a transceiver device. In some embodiments, each of at least one third device is a receiver device or a transceiver device.

In one or more embodiments, each of at least one first signal is an original signal. In at least one embodiment, each of at least one second signal is a beacon signal. In some embodiments, each of at least one first signal is a radio frequency (RF) signal.

In one or more embodiments, each of at least one first signal is a burst signal. In some embodiments, each of at least one first signal comprises data packets. In one or more embodiments, each of at least one first signal comprises a unique identifying signature. In some embodiments, the unique identifying signature is encoded in data of each of at least one first signal.

In at least one embodiment, the estimated first signal properties of at least one first signal comprise a center frequency, a modulation, a time of arrival (TOA), a signal power, a signal quality, a Doppler, and/or a unique identifying property. In some embodiments, each of at least one second signal is a RF signal.

In one or more embodiments, each of at least one second signal is a burst signal. In some embodiments, each of at least one second signal comprises data packets. In one or more embodiments, each of at least one second signal comprises a unique identifying signature. In some embodiments, the unique identifying signature is encoded in data of each of at least one second signal.

In at least one embodiment, the estimated second signal properties of at least one second signal comprise a center frequency, a frequency offset, a modulation, a TOA, a time offset, a signal power, a signal quality, a Doppler, a unique identifying property, a location of at least one third device at the TOA corresponding to at least one third device, and/or a velocity of at least one third device at the TOA corresponding to at least one third device.

In one or more embodiments, each of at least one first signal is transmitted at a known time of transmission. In some embodiments, a location and velocity of each of at least second device is known at a time of transmission of each of at least one first signal associated with each of at least one second device.

In at least one embodiment, at least one entity (e.g., a processing facility, such as processing facility 160 of FIG. 1) determines the location of the first device. In one or more embodiments, the method further comprises receiving, by the first device, the location of the first device from at least one entity.

In one or more embodiments, at least one third device determines the location of the first device. In some embodiments, the method further comprises receiving, by the first device, the location of the first device from at least one third device.

In at least one embodiment, at least some successive pairs of corresponding data of at least a portion of the estimated second signal properties are utilized to determine the location of the first device.

In one or more embodiments, at least one second device is associated with a satellite. In at least one embodiment, the satellite is a low earth orbit (LEO) satellite, a medium earth orbit (MEO) satellite, or a geosynchronous earth orbit (GEO) satellite. In some embodiments, the GEO satellite is a geostationary satellite. In one or more embodiments, the satellite is within a satellite constellation. In at least one embodiment, when there is more than at least one second device, the satellites are LEO satellites, MEO satellites, GEO satellites, or a combination thereof. In some embodiments, when there is more than at least one second device, the satellites are within one or more satellite constellations.

In at least one embodiment, at least one third device is associated with a satellite. In some embodiments, the satellite is a LEO satellite, a MEO satellite, or a GEO satellite. In one or more embodiments, the GEO satellite is a geostationary satellite. In at least one embodiment, the satellite is within a satellite constellation. In one or more embodiments, when there is more than at least one third device, the satellites are LEO satellites, MEO satellites, GEO satellites, or a combination thereof. In some embodiments, when there is more than at least one third device, the satellites are within one or more satellite constellations.

In one or more embodiments, the first device is associated with a consumer device, user equipment, a smart watch, a smart phone, a mobile phone, virtual reality glasses, a military-grade device, a computing device, an Internet of Things (IoT) device, a computer, a laptop, a tablet, a server, a vehicle, a vehicle tied device, a navigation device, a tracking device, an asset tracking device, a drone, heavy equipment, field equipment, mining equipment, shipping equipment, a device to monitor individuals, a device to track individuals, a supply chain management device, a regulatory device, an autonomous vehicle, an autonomous robot, a device for monitoring people, a secure voting device, a Transportation Security Administration (TSA) checking device, a background checking device, a security profiling device, a device track protected persons, an aircraft, an airplane, a high altitude balloon, a rail device, a train, a last mile delivery component, an industrial device, a mining device, a manufacturing device, a robotic device, a marine vehicle, a boat, a marine device, a buoy, a computing security device, infrastructure, a base station, a space junk tracking devices, smart infrastructure, and/or a smart traffic control device.

In at least one embodiment, each of at least one second device and each of at least one third device is a space device, an airborne device, a terrestrial device, a marine device, and/or an IoT device. In one or more embodiments, the terrestrial device is associated with a base station, an item of inventory, infrastructure, a building, a vehicle, an autonomous vehicle, a train, a robot, smart infrastructure, a smart traffic control device, a consumer device, user equipment, a smart watch, a smart phone, a mobile phone, virtual reality glasses, a computing device, a computer, a laptop, a tablet, and/or a server. In some embodiments, the marine device is associated with a boat and/or a buoy. In at least one embodiment, the space device is associated with a satellite and/or a space junk tracking device. In some embodiments, the airborne device is associated with an airplane, an aircraft, a drone, and/or a high altitude balloon. In some embodiments, each of at least one second device and/or each of at least one third device is, and/or is associated with, an IoT device.

In one or more embodiments, the first device transmits each of at least one second signal at a time equal to a TOA of a corresponding one of at least one first signal with an additional time offset. In some embodiments, the first device transmits at least one second signal at a frequency equal to a nominal frequency of a corresponding one of at least one first signal with an additional Doppler offset.

In at least one embodiment, a method for determining a location of a first device comprises generating, by at least one second device, at least one first signal comprising first signal properties. The method further comprises transmitting, by at least one second device, at least one first signal to the first device. In one or more embodiments, estimated first signal properties of at least one first signal are determined by the first device by measuring the first signal properties of at least one first signal. In at least one embodiment, at least one second signal, which comprises second signal properties, is generated by the first device based on at least a portion of the estimated first signal properties. In some embodiments, at least one second signal is transmitted by the first device to at least one third device. In one or more embodiments, estimated second signal properties of at least one second signal are determined by at least one third device by measuring the second signal properties of at least one second signal. In one or more embodiments, the location of the first device is determined by utilizing at least a portion of the estimated second signal properties.

In one or more embodiments, the location of the first device is determined by utilizing a time of transmission of each of at least one first signal, and utilizing a location and velocity of each of at least one second device at the time of transmission of at least one first signal.

In one or more embodiments, a method for determining a location of a first device comprises receiving, by at least one third device, at least one second signal, which comprises second signal properties, from the first device. The method further comprises determining, by at least one third device, estimated second signal properties of at least one second signal by measuring the second signal properties of at least one second signal. In one or more embodiments, estimated first signal properties of at least one first signal, which comprises first signal properties, received by the first device are determined by the first device by measuring the first signal properties of at least one first signal. In at least one embodiment, at least one second signal is generated by the first device based on at least a portion of the estimated first signal properties. In some embodiments, the location of the first device is determined by utilizing at least a portion of the estimated second signal properties.

In at least one embodiment, the location of the first device is determined by further utilizing a time of transmission of each of at least one first signal, and utilizing a location and velocity of each of at least one second device at the time of transmission of at least one first signal.

In one or more embodiments, the method further comprises generating, by at least one third device, at least one third signal based on at least a portion of the estimated second signal properties. In some embodiments, the method further comprises transmitting, by at least one third device, at least one third signal to at least one entity (e.g., processing facility, such as processing facility 160 of FIG. 1). In at least one embodiment, at least one entity determines the location of the first device. In some embodiments, the location of the first device is received by the first device from at least one entity.

In at least one embodiment, the method further comprises determining, by at least one third device, the location of the first device. In at least one embodiment, the method further comprises transmitting, by at least one third device, the location of the first device to the first device.

In one or more embodiments, a method for determining a location of a first device comprises generating, by at least one second device, at least one first signal comprising first signal properties. The method further comprises transmitting, by at least one second device, at least one first signal to the first device. Also, the method comprises receiving, by the first device, at least one first signal from at least one second device, In addition, the method comprises determining, by the first device, estimated first signal properties of at least one first signal by measuring the first signal properties of at least one first signal. Also, the method comprises generating, by the first device, at least one second signal, which comprises second signal properties, based on at least a portion of the estimated first signal properties. In addition, the method comprises transmitting, by the first device, at least one second signal to at least one third device. Additionally, the method comprises receiving, by at least one third device, at least one second signal from the first device. Further, the method comprises determining, by at least one third device, estimated second signal properties of at least one second signal by measuring the second signal properties of at least one second signal. In one or more embodiments, the location of the first device is determined by utilizing at least a portion of the estimated second signal properties.

In at least one embodiment, a system for determining a location of a first device comprises the first device to receive at least one first signal comprising first signal properties from at least one second device, to determine estimated first signal properties of at least one first signal by measuring the first signal properties of at least one first signal, to generate at least one second signal, which comprises second signal properties, based on at least a portion of the estimated first signal properties, and to transmit at least one second signal to at least one third device. In one or more embodiments, estimated second signal properties of at least one second signal are determined by at least one third device measuring the second signal properties of at least one second signal. In some embodiments, the location of the first device is determined by utilizing at least a portion of the estimated second signal properties.

In one or more embodiments, a system for determining a location of a first device comprises at least one second device to generate at least one first signal comprising first signal properties, and to transmit at least one first signal to the first device. In one or more embodiments, estimated first signal properties of at least one first signal are determined by the first device by measuring the first signal properties of at least one first signal. In some embodiments, at least one second signal, which comprises second signal properties, is generated by the first device based on at least a portion of the estimated first signal properties. In at least one embodiment, at least one second signal is transmitted by the first device to at least one third device. In some embodiments, estimated second signal properties of at least one second signal are determined by at least one third device by measuring the second signal properties of at least one second signal. In one or more embodiments, the location of the first device is determined by utilizing at least a portion of the estimated second signal properties.

In at least one embodiment, a system for determining a location of a first device comprises at least one third device to receive at least one second signal, which comprises second signal properties, from the first device, and to determine estimated second signal properties of at least one second signal by measuring the second signal properties of at least one second signal. In one or more embodiments, estimated first signal properties of at least one first signal, which comprises first signal properties, received by the first device are determined by the first device by measuring the first signal properties of at least one first signal. In at least one embodiment, at least one second signal is generated by the first device based on at least a portion of the estimated first signal properties. In some embodiments, the location of the first device is determined by utilizing at least a portion of the estimated second signal properties.

In one or more embodiments, a system for determining a location of a first device comprises at least one second device to generate at least one first signal comprising first signal properties, and to transmit at least one first signal to the first device. The system further comprises the first device to receive at least one first signal from at least one second device, to determine estimated first signal properties of at least one first signal by measuring the first signal properties of at least one first signal, to generate at least one second signal, which comprises second signal properties, based on at least a portion of the estimated first signal properties, and to transmit at least one second signal to at least one third device. Also, the system comprises at least one third device to receive at least one second signal from the first device, and to determine estimated second signal properties of at least one second signal by measuring the second signal properties of at least one second signal. In one or more embodiments, the location of the first device is determined by utilizing at least a portion of the estimated second signal properties.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

The accompanying drawings are presented to aid in the description of various aspects of the disclosure and are provided solely for illustration of the aspects and not limitation thereof.

FIG. 4 includes measurement relation formulas and system equations associated with the simplified system and variables of FIG. 3, in accordance with at least one embodiment of the present disclosure.

DETAILED DESCRIPTION

Figure 1:
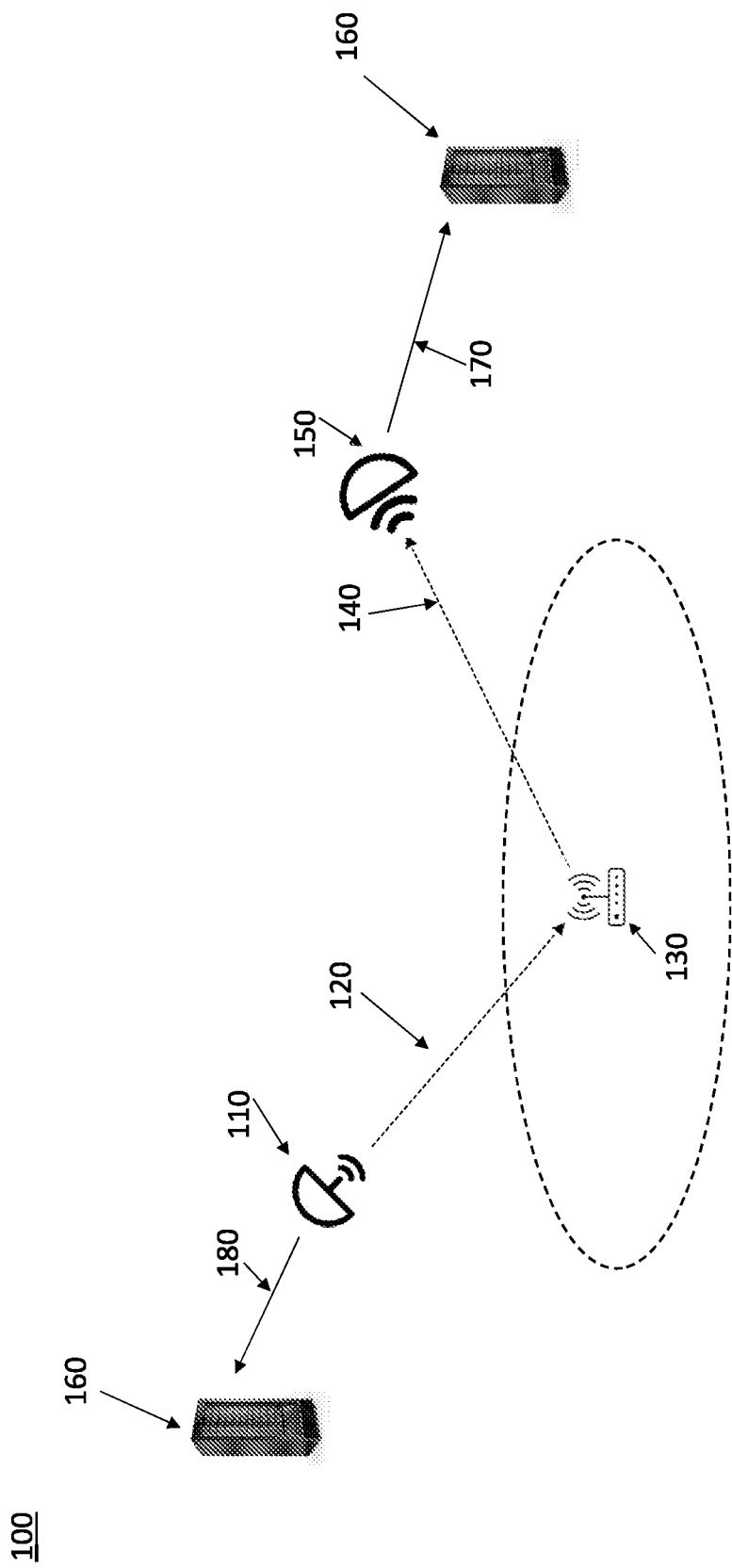
FIG. 1 is a diagram illustrating an example of the disclosed system for a low CSWAP geolocation capability that utilizes signal characteristics passed through to a backhaul network, where the system includes a single originating transmitter and a single monitoring receiver, in accordance with at least one embodiment of the present disclosure.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

As previously mentioned, historically, the geolocation of transceivers, which in some cases may herein be referred to as beacons, has been hamstrung by the need to use one or more of the traditional GNSSs, such as GPS and the Galileo European Global Navigation Satellite System. The traditional GNSS constellations are located in the MEO, which has an altitude between 2,000 km and 35,786 km above sea level on Earth. Since these MEO satellites are located so far away from Earth and utilize CW signals, signals transmitted from these satellites have a very weak signal strength as seen on Earth. This weak signal strength makes it difficult for receivers and/or transceivers on Earth to detect these signals in attenuated environments, which may be caused by inclement weather, forest canopies, manmade structures (e.g., indoor environments), jamming, and so forth. Additionally, the traditional GNSS constellations require signals transmitted from four separate satellites to enable calculation of a PNT solution.

These traditional geolocation capabilities have steered away from utilizing signal characteristics, such as Doppler, to determine the position of a beacon (e.g., transceiver). This, in large part, is due to the relatively slow moving MEO based GNSS constellations, where the change in Doppler over time is not significant enough to assist in deriving meaningful and timely PNT information. However, with the advent of a new category of GNSS constellations, Near Earth GNSS (NE-GNSS) (e.g., utilizing a time and location capability broadcast via a Low Earth Orbit (LEO) satellite constellation, such as the Iridium satellite constellation), utilization of a transmitted signal's Doppler can provide extremely valuable information in calculating a beacon's position. Additionally, if the signal provided by the NE-GNSS constellation is delivered via bursts versus a CW signal, the geolocation system has the ability to easily discern the time of arrival at the beacon. A combination of utilizing a burst signal and the NE-GNSS platform enables an extremely resilient PNT signal with powerful Doppler properties that can be used in assisting geolocation of a beacon device.

A NE-GNSS constellation includes a large quantity of satellites that provides for coverage for the entire Earth surface. For a NE-GNSS constellation, a single satellite vehicle (SV) is in-view of a receiver (or transceiver) on the ground for approximately ten (10) minutes, depending on the altitude of the SV. As such, a receiver (or transceiver) on the ground is always in-view of one SV, and likely, depending on the quantity of satellites, is in view of three or more satellite vehicles (SVs) at a time. Unlike the traditional GNSS constellations, a receiver (or transceiver) utilizing a NE-GNSS PNT constellation only requires one SV to generate a PNT solution. This is due to the SV's rapid movement across the sky, and associated Doppler effect on its signal as seen by the receiver (or transceiver). The Doppler induced signal properties of NE-GNSS constellations provided inspiration for the systems and methods of the present disclosure. However, the disclosed systems and methods are not limited to the use of NE-GNSS constellations. A host of platforms for transmitting original signals (first signals) or receiving beacon signals (second signals) may be employed. These platforms can either use naturally occurring or manually induced Doppler effects to provide the capability described herein.

In one or more embodiments, the disclosed systems and methods may have the fundamental purpose of taking advantage of a burst signal and its associated Doppler to enable lower CSWAP beacon devices. Due to the added resiliency and penetrating capability of NE-GNSS PNT signals, this low CSWAP system can operate effectively in highly attenuated environments.

Reducing the CSWAP of a beacon requires offloading as much signal processing functionality as possible. The beacon does not need to calculate its position. The beacon merely needs to assist the geolocation system by receiving original signals transmitted from one or more originating transmitters and transmitting beacon signals to one or more monitoring receivers.

The methods and apparatuses disclosed herein provide operative systems and techniques for a low CSWAP geolocation capability that utilizes signal characteristics passed through to a backhaul network. In one or more embodiments, the systems and techniques of the present disclosure employ one or more originating transmitters to transmit original signals towards a beacon (e.g., transceiver), and one or more monitoring receivers to receive beacon signals transmitted by the beacon. In at least one embodiment, the systems and techniques of the present disclosure utilize a time of transmission of the signals (e.g., the original signals) transmitted by the originating transmitter(s) and a time of arrival of the signals (e.g., the beacon signals) received by the monitoring receiver(s) to determine the location of the beacon.

In one or more embodiments, the present disclosure provides a method for geolocation using radio frequency (RF) signals with an associated Doppler shift, which can be naturally occurring or artificially induced. In some embodiments, the RF signals may be burst signals, which may include data packets. In one or more embodiments, a burst signal may be a discrete signal, packet, message, pulse, or waveform beginning at some start time and existing for a finite duration. In one or more embodiments, a burst signal may be a signal with finite energy. In one or more embodiments, a burst signal (e.g., a burst transmission) may be a broadcast transmission of data (e.g., at least one data packet) at a relatively high-bandwidth over a short period of time. In some embodiments, the burst signals may be transmitted at specified time intervals.

The disclosed method performs PNT calculations by utilizing the time of transmission of original signals transmitted from an originating transmitter(s), the beacon delay (e.g., the delay between the beacon receiving the original signals and, then, transmitting its own unique beacon signals), and a time of reception of the beacon signals received by a monitoring receiver(s). By knowing the time of transmission of the original signals by the originating transmitter(s), the beacon delay, and the time of reception of the beacon signals by the monitoring receiver(s), the time that the beacon has received the original signals transmitted from the originating transmitter(s) can be determined. Also, by utilizing the Doppler of the original signals (e.g., burst signals), the system is able to deduce which originating transmitter each original signal was transmitted, which can be used to aid in the final beacon PNT calculation.

In one or more embodiments, the disclosed method can utilize a backhaul network and a geolocation processing facility (e.g., a network server or other networked processor) to receive signal and timing information from the originating transmitter(s) and/or monitoring receiver(s), and to process the received data to rapidly calculate the beacon's position. The beacon position solution can then be sent to users and/or systems charged with monitoring the beacon, and/or sent to the beacon itself in the advent the beacon (or a device coupled with the beacon, or a user associated with the beacon) may utilize the position information.

In at least one embodiment, the disclosed method only requires the beacon to detect an original signal (e.g., a burst signal), and subsequently transmit its own unique beacon signal (e.g., a burst signal) at a fixed time later. It should be noted that, for the disclosed systems and methods, the beacon device does not require complex hardware or power intensive signal (data) processing functions, thereby significantly reducing its CSWAP. Additionally, when utilizing originating transmitters and/or monitoring receivers that have a high rate of motion, such as satellites in NE-GNSS constellations, only one originating transmitter and monitoring receiver pair is required to provide a position solution, thereby adding to the resiliency of the disclosed system.

Additional details regarding the disclosed systems and methods for a low C SWAP geolocation capability that utilizes signal characteristics passed through to a backhaul network, as well as specific implementations, are described below.

The following description of the embodiments of the invention is not intended to limit the invention to these embodiments, but rather to enable any person skilled in the art to make and use this invention. As such, the detailed description set forth below in connection with the appended drawings is intended as a description of exemplary implementations and is not intended to represent the only implementations in which the invention may be practiced. The term "exemplary" used throughout the description means "serving as an example, instance, or illustration," and should not necessarily be construed as preferred or advantageous over other exemplary implementations. The detailed description includes specific details for the purpose of providing a thorough understanding of the exemplary implementations. In some instances, some devices are shown in block diagram form. Drawing elements that are common among the following figures may be identified using the same reference numerals.

In the following description, numerous details are set forth in order to provide a more thorough description of the system. It will be apparent, however, to one skilled in the art, that the disclosed system may be practiced without these specific details. In the other instances, well known features have not been described in detail, so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the systems described herein are merely example embodiments of the present disclosure.

For the sake of brevity, conventional techniques and components related to PNT satellite systems, and other functional aspects of the overall system may not be described in detail herein. Furthermore, the connecting lines shown in the various figures contained herein are intended to represent example functional relationships and/or physical couplings between the various elements. It should be noted that many alternative or additional functional relationships or physical connections may be present in one or more embodiments of the present disclosure.

FIG. 1 is a diagram illustrating an example of the disclosed system 100 for a low CSWAP geolocation capability that utilizes signal characteristics passed through to a backhaul network, where the system 100 includes a single originating transmitter 110 and a single monitoring receiver 150, in accordance with at least one embodiment of the present disclosure. In FIG. 1, the system 100 is shown to include four types of hardware components, which may include a beacon device 130 (e.g., a first device), an originating transmitter 110 (e.g., a second device), a monitoring receiver 150 (e.g., a third device), and a processing facility 160 (e.g., which may include at least one computer server). It should be noted that each of these hardware components (e.g., the beacon device 130, originating transmitter 110, monitoring receiver 150, and processing facility 160) may include a transceiver, which can include both a receiver configured to receive electromagnetic (EM) signals (e.g., RF signals) wirelessly and/or via wire, and a transmitter configured to transmit EM signals (e.g., RF signals) wirelessly and/or via wire. It should be noted that although the system 100 is shown in FIG. 1 to include two separate processing facilities 160, the system 100 may only include one processing facility 160.

In one or more embodiments, the system 100 may include multiple of each of the four types of hardware components (e.g., the beacon device 130, originating transmitter 110, monitoring receiver 150, and processing facility 160). In some embodiments, for example, the system 100 of FIG. 1 may include hundreds of originating transmitters 110, beacons 130, monitoring receivers 150, and/or processing facilities 160. For example, the disclosed system 100 may include multiple originating transmitters 110 (e.g., originating transmitters 610a, 610b, 610c, 601c of FIG. 6) and multiple monitoring receivers 150 (e.g., monitoring receivers 650a, 650b, 650c, 650d of FIG. 6), as is shown in the system 600 of FIG. 6. Additionally, in one or more embodiments, these hardware components (e.g., beacon device 130, originating transmitter 110, monitoring receiver 150, and processing facility 160) can operate in a number of different environments (e.g., a space, air, terrestrial, and/or marine, such as ocean, environment).

In one or more embodiments, the originating transmitter 110 and/or the monitoring receiver 150 may be associated with a satellite, which may be a LEO, MEO, and/or Geosynchronous Earth Orbit (GEO) satellite (e.g., a geostationary satellite). In some embodiments, the originating transmitter 110 and/or the monitoring receiver 150 may be associated with a satellite within a NE-GNSS constellation. In one or more embodiments, the originating transmitter 110 and/or monitoring receiver 150 may be on a space-based platform, an airborne platform, a sea-based platform, and/or a terrestrial platform. In one or more embodiments, the beacon device 130 may be associated with a device that may be associated with a user, such as a smart phone (e.g., beacon device 1330 of FIG. 13), a computing device, a smart watch, virtual reality glasses, or a vehicle (e.g., beacon device 1130a of FIG. 11). In one or more embodiments, the processing facility 160 may be a building (e.g., an operation center), which may include at least one computing device, such as a computer server.

The system 100 is shown in FIG. 1 to also include four communications paths, which may include a communication path for the transmission of a signal 120 (e.g., which may be referred to as a first signal and/or an original signal) from the originating transmitter 110 to the beacon device 130, a communication path for the transmission of a signal 180 from the originating transmitter 110 to the processing facility 160, a communication path for the transmission of the signal 140 (e.g., which may be referred to as a second signal and/or a beacon signal) from the beacon device 130 to the monitoring receiver 150, and a communication path for the transmission of the signal 170 from the monitoring receiver 150 to the processing facility 160. In one or more embodiments, the signals 120, 180, 140, and/or 170 are EM signals (e.g., RF signals). In some embodiments, the signals 120, 180, 140, and/or 170 may each be in the form of a burst signal and may contain data packets. It should be noted that in one or more embodiments, one or more of the signals 120, 140, 180, 170 may be transmitted wirelessly and/or via wire.

In one or more embodiments, to enable a low CSWAP beacon device (e.g., beacon device 130) with vast improvements to position convergence times and position accuracies, the power and hardware resources typically used for signal processing and position/navigation processing should be off-loaded to a processing facility (e.g., processing facility 160). In order to accomplish adequate convergence times and position calculations, the processing facility 160 may require information about the original transmission signal (e.g., signal 120), which may be a burst signal, and details of the beacon signal (e.g., signal 140) as it is received by the monitoring receiver 150. The processing facility 160, free of power and hardware constraints, can utilize all the original signal (e.g., signal 120) and beacon signal (e.g., signal 140) transmission information to calculate the position of the beacon device 130. In at least one embodiment, the beacon 130 may offload some of the processing to multiple entities, such as a device coupled with the beacon 130 and the processing facility 160.

For example, during operation of the system 100 of FIG. 1, the originating transmitter 110 may generate and transmit (e.g., wirelessly) the signal 120 (e.g., original signal) to the beacon device 130. The signal 120 may be an EM signal (e.g., RF signal), and may be in the form of a burst signal. The signal 120 may also include a plurality of data packets. In some embodiments, the signal 120 may have a unique identifying signature, and the identifying signature may be encoded in the data of the signal 120. In one or more embodiments, the transmission of the signal 120 by the originating transmitter 110 can occur at a known time (e.g., a time known by the originating transmitter 110). In some embodiments, the location and velocity of the originating transmitter 110 may be known at the time of the transmission of the signal 120 (e.g., the originating transmitter 110 knows its location and velocity at the time of transmission of the signal 120). In some embodiments, the velocity may be estimated based on other knowns, or could be assumed to be zero if the transmitter is known to be static or stationary.

After the signal 120 is transmitted to the beacon device 130 by the originating transmitter 110, the beacon device 130 can receive the signal 120. After the beacon device 130 receives the signal 120 from the originating transmitter 110, the beacon device 130 may determine (measure) estimated signal properties of the received signal 120. It should be noted that all measurements of the signal properties are inherently estimates due to precision and accuracy errors. In one or more embodiments, the estimated signal properties of the signal 120 may include, but are not limited to, a center frequency of the signal 120, a modulation of the signal 120, a time of arrival (TOA) of the signal 120 at the beacon device 130, a signal power of the signal 120, a signal quality (e.g., signal-to-noise ratio (SNR) and/or carrier-to-noise density ratio (C/No)) of the signal 120, a Doppler (e.g., phase shift indicative of motion) of the signal 120, and/or at least one unique identifying property (e.g., encoded data sequence and/or pseudorandom (PRN) code) of the signal 120.

After the beacon device 130 determines the estimated signal properties of the received signal 120, the beacon device 130 may generate a signal 140 (e.g., beacon signal) based on (e.g., derived from and/or dependent upon) the estimated signal properties of the received signal 120. In one or more embodiments, the signal 140 may be an EM signal, such as an RF signal. The signal 140 can be in the form of a burst signal, and can include a plurality of data packets. In some embodiments, the signal 140 may have a unique identifying signature, which can be encoded in the data of the signal 140.

After the beacon device 130 generates the signal 140, the beacon device 130 may transmit (e.g., wirelessly) the signal 140 (e.g., beacon signal) to the monitoring receiver 150. In one or more embodiments, the beacon device 130 may transmit the signal 140 after a fixed time delay, or at a predefined time cadence, after the receiving of the signal 120. After the monitoring receiver 150 receives the signal 140, the monitoring receiver 150 may determine (measure) estimated signal properties of the received signal 140. In one or more embodiments, the estimated signal properties of the signal 140 may include, but are not limited to, a center frequency of the signal 140, a frequency offset of the signal 140, a modulation of the signal 140, a TOA of the signal 140 at the monitoring receiver 150, a position and velocity of the monitoring receiver 150 at the time of arrival of the signal 140 at the monitoring receiver 150, a time offset of the signal 140, a signal power of the signal 140, a signal quality (e.g., SNR and/or C/No) of the signal 140, a Doppler (e.g., phase shift indicative of motion) of the signal 140, and/or at least one unique identifying property (e.g., encoded data sequence and/or PRN code) of the signal 140.

After the monitoring receiver 150 has determined the estimated signal properties of the signal 140, the monitoring receiver 150 may generate and transmit (e.g., wirelessly and/or via wire) a signal 170 to the processing facility 160. The signal 170 may include at least a subset of the signal properties (which may include at least some estimated signal properties) of the signal 140, which may at least include the TOA of the signal 140 at the monitoring receiver 150, and a location (position) and velocity of the monitoring receiver 150 at the time of arrival of the signal 140 at the monitoring receiver 150. Also, the originating transmitter 110 may generate and transmit (e.g., wirelessly and/or via wire) a signal 180 to the processing facility 160. The signal 180 may include at least at subset of signal properties (which may include at least some estimated signal properties) of the signal 120, which may at least include a time of transmission of the signal 120 from the originating transmitter 110 to the beacon device 130, and a location (position) and velocity of the originating transmitter 110 at the time of the transmission of the signal 120 to the beacon device 130.

After the processing facility 160 has received the signal 170 from the monitoring receiver 150 and the signal 180 from the originating transmitter 110, the processing facility 160 may perform geolocation of the beacon device 130 by determining the location (position) of the beacon device 130 based on (utilizing) the data included within the signal 170 (e.g., the TOA of the signal 140 at the monitoring receiver 150, and a location (position) and velocity of the monitoring receiver 150 at the time of arrival of the signal 140 at the monitoring receiver 150) and the data included within the signal 180 (e.g., the time of transmission of the signal 120 from the originating transmitter 110 to the beacon device 130, and the location (position) and velocity of the originating transmitter 110 at the time of the transmission of the signal 120 to the beacon device 130).

After the processing facility 160 has determined the location (position) of the beacon device 130, the processing facility 160 may transmit the location to the beacon device 130. It should be noted that, in one or more embodiments, the monitoring receiver 150 may perform the geolocation of the beacon device 130 instead of, or in conjunction with, the processing facility 160. For these cases, the monitoring receiver 150 can receive, from the originating transmitter 110, the signal 180, which can include the time of transmission of the signal 120 from the originating transmitter 110 to the beacon device 130 and the location (position) and velocity of the originating transmitter 110 at the time of the transmission of the signal 120 to the beacon device 130.

Figure 2:
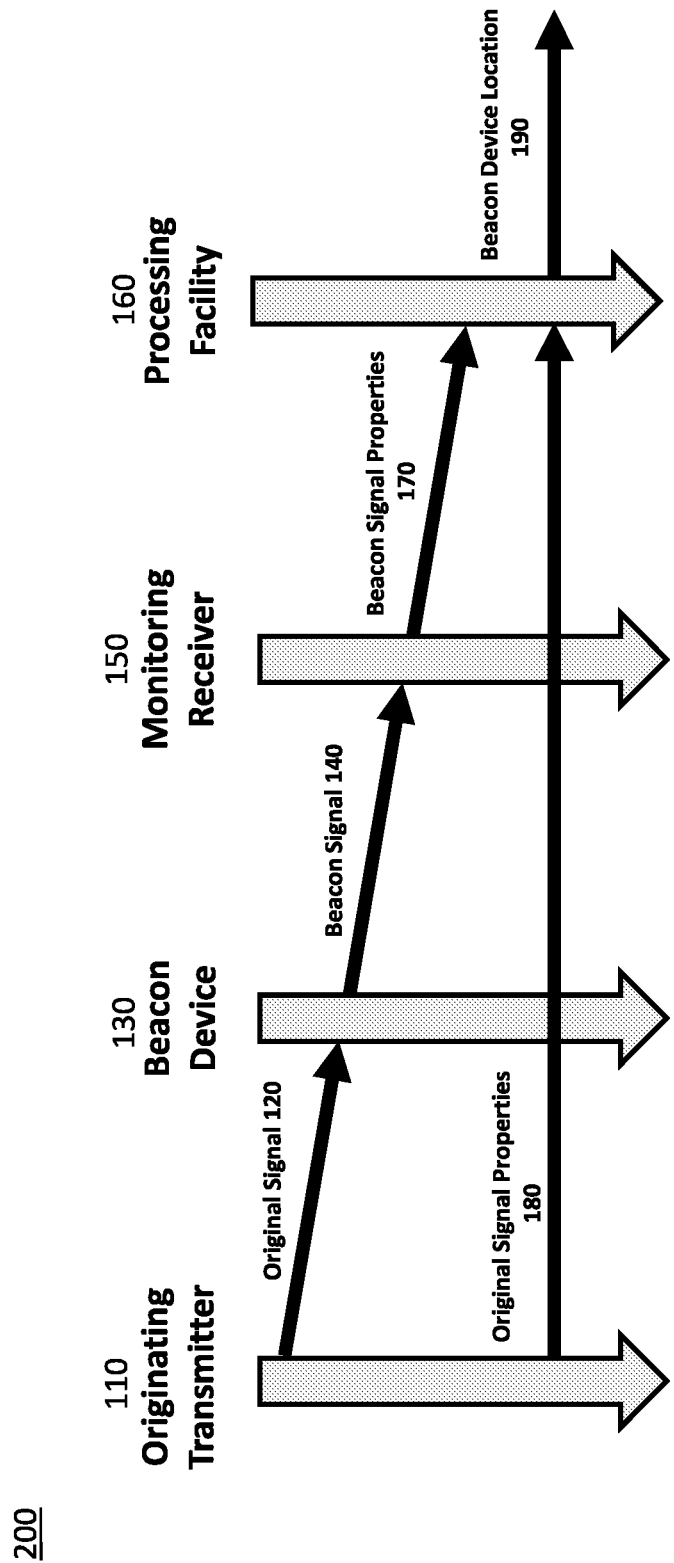
FIG. 2 is a diagram illustrating an example of signaling that may be employed by the system of FIG. 1, in accordance with at least one embodiment of the present disclosure.

FIG. 2 is a diagram illustrating an example of signaling 200 that may be employed by the system 100 of FIG. 1, in accordance with at least one embodiment of the present disclosure. As shown in FIG. 2, the originating transmitter 110 may generate and transmit the signal 120 (e.g., original signal), which may be a burst signal, to the beacon device 130. After the beacon device 130 receives the original signal 120, the beacon device 130 may generate and transmit a signal 140 (e.g., beacon signal) to the monitoring receiver 150.

After the monitoring receiver 150 receives the signal 140 (e.g., beacon signal), the monitoring receiver 150 may generate and transmit the signal 170 (e.g., containing beacon signal properties) to the processing facility 160. The originating transmitter 110 may also generate and transmit the signal 180 (e.g., containing original signal properties) to the processing facility 160. After the processing facility 160 receives the signal 170 and the signal 180, the processing facility 160 may generate and transmit (e.g., to a management facility) a signal 190 containing the location of the beacon device 130.

Figure 3:
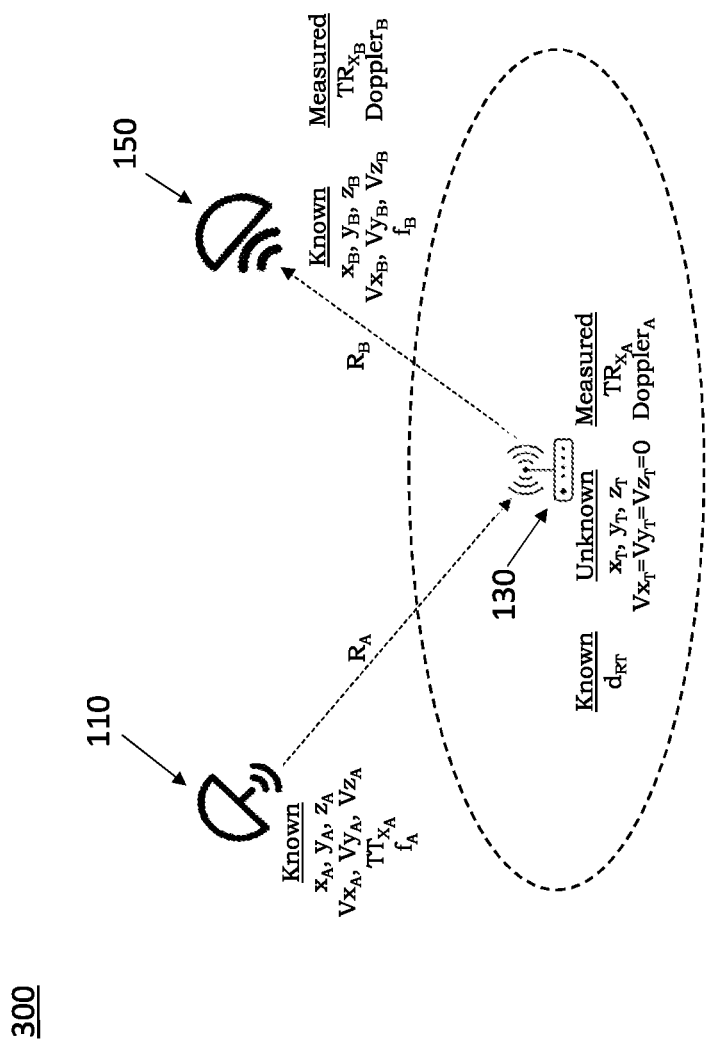
FIG. 3 is a diagram illustrating an example of a simplified system of the disclosed system of FIG. 1 including associated variables, in accordance with at least one embodiment of the present disclosure.

FIG. 3 is a diagram illustrating an example of a simplified system 300 of the disclosed system 100 of FIG. 1 including associated variables, in accordance with at least one embodiment of the present disclosure. In FIG. 3, the originating transmitter 110, the beacon device 130, and the monitoring receiver 150 of FIG. 1 are shown. The originating transmitter 110 may transmit a signal $R_A$ (e.g., the original signal) towards the beacon device 130 at time $TT_{XA}$ and at frequency $f_A$. At the time of the transmission of signal $R_A$, the originating transmitter 110 is located at position $x_A$, $y_A$, $z_A$ and has a velocity of $Vx_A$, $Vy_A$, $Vz_A$.

After the beacon device 130 receives the signal $R_A$, the beacon device 130 may determine a time of arrival ($TR_{XA}$) and Doppler ($Doppler_A$) of the received signal $R_A$. The beacon device 130 may then generate and transmit a signal $R_B$ (e.g., beacon signal), which may be based on (e.g., derived from) signal properties of signal $R_A$, towards the monitoring receiver 150 at time $TT_{XB}$, which may occur after a fixed time delay ($d_{RT}$), and at a frequency ($f_B$+ $Doppler_A$).

After the monitoring receiver 150 receives the signal $R_B$, the monitoring receives 150 may determine a time of arrival ($TR_{XB}$) and Doppler ($Doppler_B$) of the received signal $R_B$. The monitoring receiver 150 may transmit a signal (e.g., signal 170 of FIG. 1), which may be based on (e.g., derived from) signal properties of signal $R_B$, at frequency $f_B$ towards a processing facility (e.g., the processing facility 160 of FIG. 1) for determination of the location ($x_T$, $y_T$, $z_T$) and velocity ($Vx_T$, $Vy_T$, $Vz_T$) of the beacon device 130. At the time of the transmission of signal by the monitoring receiver 150 to the processing facility, the monitoring receiver 150 is located at position $x_B$, $y_B$, $z_B$ and has a velocity of $Vx_B$, $Vy_B$, $Vz_B$.

FIG. 4 includes measurement relation formulas 410 and system equations 420 associated with the simplified system 300 and variables of FIG. 3, in accordance with at least one embodiment of the present disclosure. In particular, in FIG. 4, the formulas 410 are for measurement relations, and the formulas 420 are system equations. For the formulas 410, 420, the variable c is equal to the speed of light.

Figure 5:
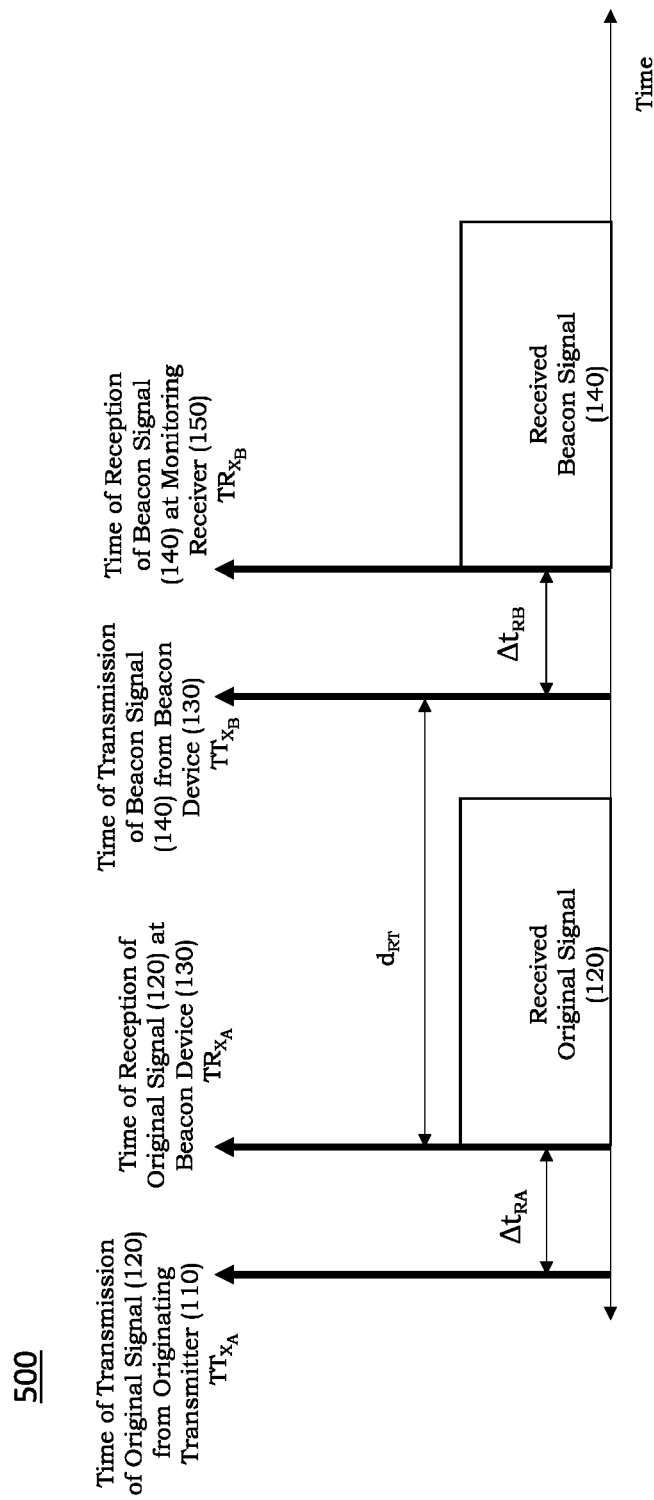
FIG. 5 is a diagram illustrating an example of timing for the transmitting and receiving of signaling for the simplified system of FIG. 3, in accordance with at least one embodiment of the present disclosure.

FIG. 5 is a diagram illustrating an example of timing 500 for the transmitting and receiving of signaling (e.g., signals 120, 140) for the simplified system 300 of FIG. 3, in accordance with at least one embodiment of the present disclosure. In FIG. 5, the signal 120 (e.g., the original signal) may be transmitted from the originating transmitter 110 towards the beacon device 130 at a time $TT_{XA}$. The signal 120 (e.g., the original signal) may be received by the beacon device 130 at a time $TR_{XA}$, which is after $TT_{XA}$ for a time $\Delta t_{RA}$.

After a delay of $d_{RT}$ after the receiving of the signal 120 by the beacon device 130, the beacon device 130 may transmit the signal 140 (e.g., the beacon signal) towards the monitoring receiver 150 at a time $TT_{XB}$. Then, the signal 140 may be received by the monitoring receiver 150 at a time $TR_{XB}$, which is after $TT_{XB}$ for a time $\Delta t_{RB}$.

Figure 6:
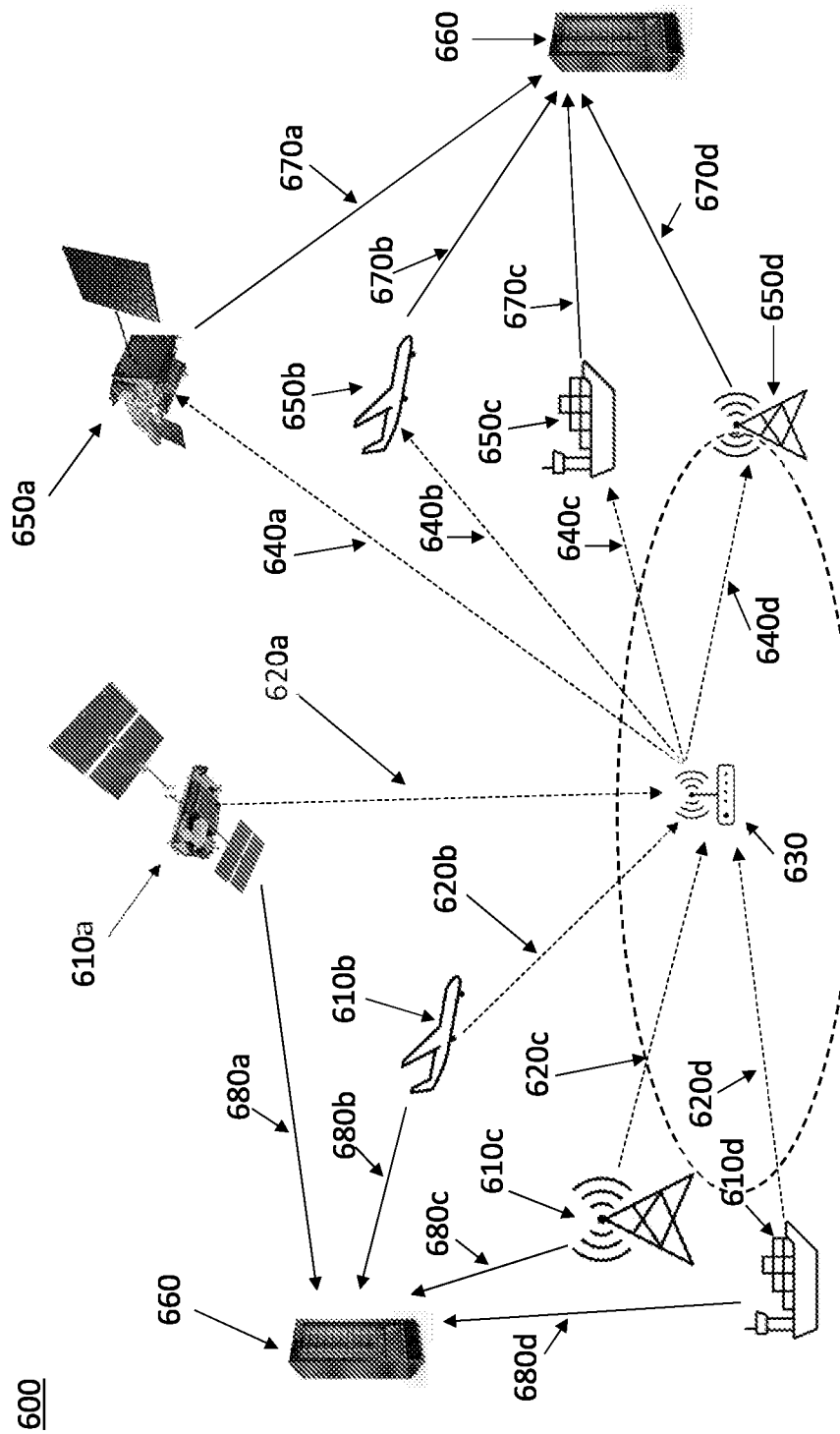
FIG. 6 is a diagram illustrating an example of the disclosed system for a low CSWAP geolocation capability that utilizes signal characteristics passed through to a backhaul network, where the system includes multiple originating transmitters and multiple monitoring receivers, in accordance with at least one embodiment of the present disclosure.

FIG. 6 is a diagram illustrating an example of the disclosed system 600 for a low CSWAP geolocation capability that utilizes signal characteristics passed through to a backhaul network, where the system 600 includes multiple originating transmitters 610a, 610b, 610c, 610d and multiple monitoring receivers 650a, 650b, 650c, 650d, in accordance with at least one embodiment of the present disclosure. The system 600 of FIG. 6 is similar to the system 100 of FIG. 1, except the system 600 of FIG. 6 has multiple originating transmitters 610a, 610b, 610c, 610d and multiple monitoring receivers 650a, 650b, 650c, 650d, as opposed to only one originating transmitter 110 and only one monitoring receiver 150, as is shown in FIG. 1.

In particular, in FIG. 6, the system 600 is shown to include four types of hardware components, which may include a beacon device 630 (e.g., a first device), originating transmitters 610a, 610b, 610c, 610d (e.g., second devices), monitoring receivers 650a, 650b, 650c, 650d (e.g., third devices), and a processing facility 660 (e.g., which may include at least one computer server). Each of the hardware components in FIG. 6 may include a transceiver, which may include a receiver configured to receive EM signals (e.g., RF signals) wirelessly and/or via wire, and a transmitter configured to transmit EM signals (e.g., RF signals) wirelessly and/or via wire. Although the system 600 is shown to include two separate processing facilities 660, in one or more embodiments, the system 600 may only include one processing facility 660.

In one or more embodiments, the system 600 of FIG. 6 may include more beacon devices 630 and/or more processing facilities 660, than as shown in FIG. 6. In some embodiments, the system 600 of FIG. 6 may include more or less originating transmitters 610a, 610b, 610c, 610d and/or more or less monitoring receivers 650a, 650b, 650c, 650d, than as shown in FIG. 6. In one or more embodiments, the hardware components of the system 600 of FIG. 6 can operate in a number of different environments (e.g., a space, air, terrestrial, and/or marine, such as ocean, environment).

In one or more embodiments, at least one of the originating transmitters 610a, 610b, 610c, 610d and/or at least one of the monitoring receivers 650a, 650b, 650c, 650d may be associated with LEO, MEO, and/or GEO (e.g., geostationary) satellites. In some embodiments, at least one of the originating transmitters 610a, 610b, 610c, 610d and/or at least one of the monitoring receivers 650a, 650b, 650c, 650d may be associated with a NE-GNSS satellite within a NE-GNSS satellite constellation. It should be noted that, in some embodiments, the system 600 may employ, for the originating transmitters 610a, 610b, 610c, 610d and/or the monitoring receivers 650a, 650b, 650c, 650d, a combination of satellites in different orbital constellations, satellite constellations, and/or individual satellite deployments as transmitters and/or receivers. In one or more embodiments, the number and/or size of satellites employed by the system 600 may vary, which may be dependent upon the orbit of the satellites, the primary missions of the satellites, and/or the use cases for the satellites. In one or more embodiments, the system 600 may include traditional GNSS satellites as well as a variety of other satellite configurations (e.g., satellite configurations including Iridium satellites and/or satellites from other satellite constellations, such as Kuiper, OneWeb, SpaceX, and/or Small/Cube/Micro/SpaceBEE). In one or more embodiments, various combinations of satellites, such as SpaceX satellites and/or SpaceBEE satellites, may be employed by the disclosed system 600.

In one or more embodiments, at least one of the originating transmitters 610a, 610b, 610c, 610d and/or at least one of the monitoring receivers 650a, 650b, 650c, 650d may be on a space-based platform, an airborne platform, a sea-based platform, and/or a terrestrial platform. For example, as shown in FIG. 6, the originating transmitter 610a is a satellite, the originating transmitter 610b is an airplane, the originating transmitter 610c is a cellular tower, and the originating transmitter 610d is a ship. Also shown in FIG. 6, the monitoring receiver 650a is a satellite, the monitoring receiver 650b is an airplane, the monitoring receiver 650c is a cellular tower, and the monitoring receiver 650d is a ship. It should be noted that, in one or more embodiments, the system 600 of FIG. 6 may employ different types of devices for at least one of the originating transmitters 610a, 610b, 610c, 610d and/or at least one of the monitoring receivers 650a, 650b, 650c, 650d, than as shown in FIG. 6.

Figure 11:
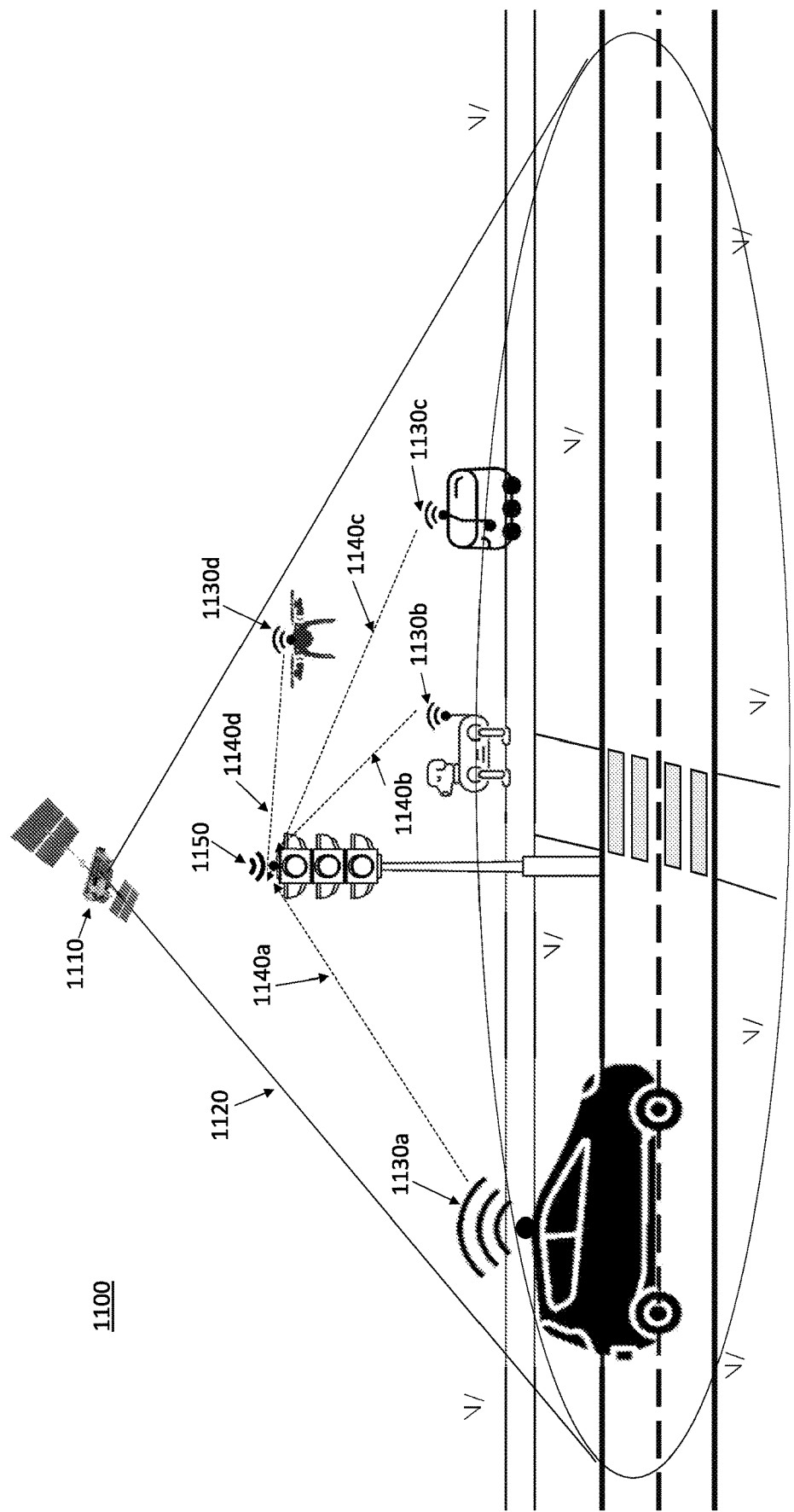
FIG. 11 is a diagram illustrating an example of the disclosed system for a low CSWAP geolocation capability that utilizes signal characteristics passed through to a backhaul network, where the system may be employed for regulatory purposes, in accordance with at least one embodiment of the present disclosure.

In one or more embodiments, the beacon device 630 may be associated with a device that may be associated with a user, such as a smart phone (e.g., beacon device 1330 of FIG. 13), a computing device, a smart watch, virtual reality glasses, or a vehicle (e.g., beacon device 1130a of FIG. 11). In some embodiments, the processing facility 660 may be a building (e.g., an operation center), which may include at least one computing device, such as a computer server.

It should be noted that the system 600 may employ a variety of different types of devices that may be utilized for various different user applications. As noted above, the beacon device 630 may be a stand-alone device (e.g., a server) or a device (e.g., a smart phone) associated with a user. In one or more embodiments, the beacon device 630 may be associated with (e.g., include or be coupled with), but not limited to, consumer devices (e.g., user equipment, such as smart watches, smart phones, mobile phones, and/or virtual reality glasses), military-grade devices, Internet of Things (IoT) devices, computing nodes or devices (e.g., computers, laptops, tablets, and/or servers), vehicles, vehicle tied devices (e.g., a navigation and/or tracking device), asset tracking devices (e.g., vehicles, fleet drones, heavy equipment, field equipment, mining equipment, and/or shipping equipment), devices to support monitoring and/or tracking of individuals, supply chain management devices, regulatory devices (e.g., drones, vehicles, autonomous vehicles, autonomous robots, devices for monitoring people, mobile phones, secure voting devices, Transportation Security Administration (TSA) checking devices, background checking devices, security profiling devices, and/or devices to track protected persons), autonomous vehicles, aircraft (e.g., airplanes, drones, and/or high altitude balloons), rail devices (e.g., trains), last mile delivery components, industrial devices (e.g., mining devices, manufacturing devices, and/or robotic devices), marine vehicles (e.g., boats), marine devices (e.g., buoys), computing security devices, infrastructure (e.g., base stations and/or space junk tracking devices), and/or smart infrastructure (e.g., smart traffic control device, such as smart stop lights).

In one or more embodiments, the system 600 of FIG. 6 may include additional processing facilities, which may be dependent upon the size of the system 600 and/or whether different types of devices with different use cases (and/or for sub-groups of users) are being employed for the system 600. For example, for the case where the locations of a specific set of devices are very sensitive and a user(s) associated with those devices wants the data of those devices to be controlled very securely, the system 600 may include at least one additional processing facility, which has a high level of security, for the processing associated with those devices.

The system 600 in FIG. 6 also includes four types of communications paths, which may include communications paths for the transmission of signals 620a, 620b, 620c, 620d (e.g., which may be referred to as first signals, originating signals, and/or original signals) from the originating transmitters 610a, 610b, 610c, 610d to the beacon device 630, communication paths for the transmission of signals 680a, 680b, 680c, 680d from the originating transmitters 610a, 610b, 610c, 610d to the processing facility 660, communication paths for the transmission of signals 640a, 640b, 640c, 640d (e.g., which may be referred to as second signals and/or beacon signals) from the beacon device 630 to the monitoring receivers 650a, 650b, 650c, 650d, and communication paths for the transmission of signals 670a, 670b, 670c, 670d from the monitoring receivers 650a, 650b, 650c, 650d to the processing facility 660. In one or more embodiments, at least one of the signals of signals 620a-620d, 680a-680d, 640a-640d, and/or 670a-670d is an EM signal (e.g., an RF signal). In some embodiments, at least one of the signals of signals 620a-620d, 680a-680d, 640a-640d, and/or 670a-670d may be in the form of a burst signal and may contain data packets. It should be noted that in one or more embodiments, at least one of the signals of signals 620a-620d, 680a-680d, 640a-640d, and/or 670a-670d may be transmitted wirelessly and/or via wire.

During operation of the system 600 of FIG. 6, the originating transmitters 610a, 610b, 610c, 610d may each generate and transmit (e.g., wirelessly) signals 620a, 620b, 620c, 620d (e.g., original signals) to the beacon device 130. The signals 620a, 620b, 620c, 620d may each be EM signals (e.g., RF signals), and may each be in the form of a burst signal. The signals 620a, 620b, 620c, 620d can also include a plurality of data packets. In some embodiments, the signals 620a, 620b, 620c, 620d can each have a unique identifying signature, and the identifying signature may be encoded in the data of the signals 620a, 620b, 620c, 620d. The transmission of each of the signals 620a, 620b, 620c, 620d by their corresponding originating transmitter 610a, 610b, 610c, 610d can occur at a known time (e.g., a time known by each of the originating transmitters 610a, 610b, 610c, 610d). In some embodiments, the location and velocity of each of the originating transmitters 610a, 610b, 610c, 610d may be known at the time of the transmission of the signals 620a, 620b, 620c, 620d (e.g., the originating transmitters 610a, 610b, 610c, 610d know their location and velocity at the time of transmission of their corresponding signals 620a, 620b, 620c, 620d).

After the signals 620a, 620b, 620c, 620d are transmitted to the beacon device 630 by the originating transmitters 610a, 610b, 610c, 610d, the beacon device 630 can receive the signals 620a, 620b, 620c, 620d. After the beacon device 630 receives the signal 620a, 620b, 620c, 620d from the originating transmitters 610a, 610b, 610c, 610d, the beacon device 630 may determine (measure) estimated signal properties for each of the signals 620a, 620b, 620c, 620d. It should be noted that all measurements of the signal properties are inherently estimates due to precision and accuracy errors. In one or more embodiments, the estimated signal properties for each of the signals 620a, 620b, 620c, 620d may include, but are not limited to, a center frequency of each of the signals 620a, 620b, 620c, 620d, a modulation of each of the signals 620a, 620b, 620c, 620d, a TOA of each of the signals 620a, 620b, 620c, 620d at the beacon device 630, a signal power of each of the signals 620a, 620b, 620c, 620d, a signal quality (e.g., SNR and/or C/No) of each of the signals 620a, 620b, 620c, 620d, a Doppler of each of the signals 620a, 620b, 620c, 620d, and/or at least one unique identifying property (e.g., encoded data sequence and/or PRN code) of each of the signals 620a, 620b, 620c, 620d.

After the beacon device 630 determines the estimated signal properties of the received signals 620a, 620b, 620c, 620d, the beacon device 630 may generate a corresponding signal 640a, 640b, 640c, 640d (e.g., beacon signals) for each of the received signals 620a, 620b, 620c, 620d, where the signals 640a, 640b, 640c, 640d are based on (e.g., derived from and/or dependent upon) the estimated signal properties of their corresponding signals 620a, 620b, 620c, 620d. In one or more embodiments, the signals 640a, 640b, 640c, 640d may each be an EM signal, such as an RF signal. The signals 640a, 640b, 640c, 640d can each be in the form of a burst signal, and can include a plurality of data packets. In some embodiments, the signals 640a, 640b, 640c, 640d may each have a unique identifying signature, which can be encoded in the data of each of the signals 640a, 640b, 640c, 640d.

After the beacon device 630 generates the signals 640a, 640b, 640c, 640d, the beacon device 630 may transmit (e.g., wirelessly) the signals 640a, 640b, 640c, 640d (e.g., beacon signals) to the monitoring receivers 650a, 650b, 650c, 650d. In one or more embodiments, the beacon device 630 may transmit each of the signals 640a, 640b, 640c, 640d after a fixed time delay after the receiving of their corresponding signals 620a, 620b, 620c, 620d by the beacon device 630. After the monitoring receivers 650a, 650b, 650c, 650d receive the signals 640a, 640b, 640c, 640d, the monitoring receivers 650a, 650b, 650c, 650d may determine (measure) estimated signal properties for each of the received signals 640a, 640b, 640c, 640d. In one or more embodiments, the estimated signal properties for each of the signals 640a, 640b, 640c, 640d may include, but are not limited to, a center frequency of each of the signals 640a, 640b, 640c, 640d, a frequency offset of each of the signals 640a, 640b, 640c, 640d, a modulation of each of the signals 640a, 640b, 640c, 640d, a TOA of each of the signals 640a, 640b, 640c, 640d at their corresponding monitoring receivers 650a, 650b, 650c, 650d, a position and velocity of each of the monitoring receivers 650a, 650b, 650c, 650d at the time of arrival of their corresponding signals 640a, 640b, 640c, 640d at the monitoring receivers 650a, 650b, 650c, 650d, a time offset of each of the signals 640a, 640b, 640c, 640d, a signal power of each of the signals 140, a signal quality (e.g., SNR and/or C/No) of each of the signals 640a, 640b, 640c, 640d, a Doppler (e.g., phase shift indicative of motion) of each of the signals 640a, 640b, 640c, 640d, and/or at least one unique identifying property (e.g., encoded data sequence and/or PRN code) of each of the signals 640a, 640b, 640c, 640d.

After the monitoring receivers 650a, 650b, 650c, 650d have determined the estimated signal properties of each of their corresponding signals 640a, 640b, 640c, 640d, the monitoring receivers 650a, 650b, 650c, 650d may generate and transmit (e.g., wirelessly and/or via wire) signals 670a, 670b, 670c, 670d to the processing facility 660. These signals 670a, 670b, 670c, 670d may include at least a subset of the signal properties (which may include at least some estimated signal properties) of their corresponding signals 640a, 640b, 640c, 640d, which may at least include the TOA of each of the signals 640a, 640b, 640c, 640d at their corresponding monitoring receivers 650a, 650b, 650c, 650d, and a location (position) and velocity of each of the monitoring receivers 650a, 650b, 650c, 650d at the time of arrival of each of the corresponding signals 640a, 640b, 640c, 640d at the monitoring receivers 650a, 650b, 650c, 650d. Also, the originating transmitters 610a, 610b, 610c, 610d may generate and transmit (e.g., wirelessly and/or via wire) signals 680a, 680b, 680c, 680d to the processing facility 660. The signals 680a, 680b, 680c, 680d may each include at least at subset of signal properties (which may include at least some estimated signal properties) of their corresponding signals 620a, 620b, 620c, 620d, which may at least include a time of transmission of each of the signals 620a, 620b, 620c, 620d from their corresponding originating transmitters 610a, 610b, 610c, 610d to the beacon device 630, and a location (position) and velocity of each of the originating transmitters 610a, 610b, 610c, 610d at the time of the transmission of each of their corresponding signals 620a, 620b, 620c, 620d to the beacon device 630.

After the processing facility 660 has received the signals 670a, 670b, 670c, 670d from the monitoring receivers 650a, 650b, 650c, 650d and the signals 680a, 680b, 680c, 680d from the originating transmitters 610a, 610b, 610c, 610d, the processing facility 660 may perform geolocation of the beacon device 630 by determining the location (position) of the beacon device 630 based on (utilizing) the data included within the signals 670a, 670b, 670c, 670d (e.g., the TOA of each of the signals 640a, 640b, 640c, 640d at their corresponding monitoring receivers 650a, 650b, 650c, 650d, and a location (position) and velocity of each of the monitoring receivers 650a, 650b, 650c, 650d at the time of arrival of the signals 640a, 640b, 640c, 640d at the monitoring receivers 650a, 650b, 650c, 650d) and the data included within the signals 680a, 680b, 680c, 680d (e.g., the time of transmission of each of the signals 620a, 620b, 620c, 620d from their corresponding originating transmitters 610a, 610b, 610c, 610d to the beacon device 630, and the location (position) and velocity of each of the originating transmitters 610a, 610b, 610c, 610d at the time of the transmission of their corresponding signals 620a, 620b, 620c, 620d to the beacon device 630).

After the processing facility 660 has determined the location (position) of the beacon device 630, the processing facility 660 can transmit the location to the beacon device 630. It should be noted that, in one or more embodiments, at least one of the monitoring receivers 650a, 650b, 650c, 650d may perform the geolocation of the beacon device 630 instead of, or in conjunction with, the processing facility 660. For these cases, the monitoring receiver(s) 650a, 650b, 650c, 650d can receive, from at least one originating transmitter 610a, 610b, 610c, 610d, the signal(s) 680a, 680b, 680c, 680d, which can include the time of transmission of the signal(s) 620a, 620b, 620c, 620d from the originating transmitter(s) 610a, 610b, 610c, 610d to the beacon device 630, and the location (position) and velocity of the originating transmitter(s) 610a, 610b, 610c, 610d at the time of the transmission of the signal(s) 620a, 620b, 620c, 620d to the beacon device 630.

Figure 7:
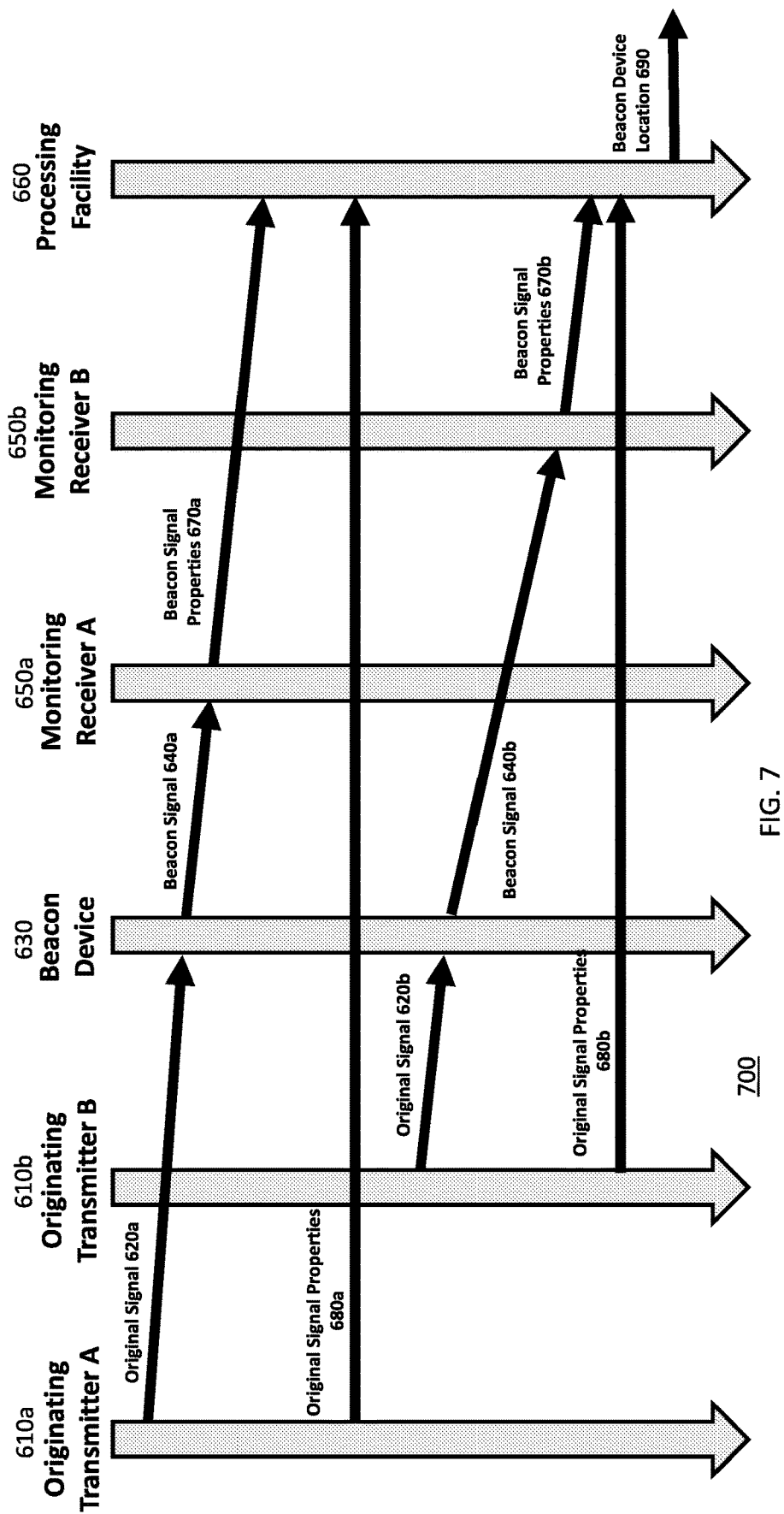
FIG. 7 is a diagram illustrating an example of signaling that may be employed by the system of FIG. 6, in accordance with at least one embodiment of the present disclosure.

FIG. 7 is a diagram illustrating an example of signaling 700 that may be employed by the system 600 of FIG. 6, in accordance with at least one embodiment of the present disclosure. It should be noted that for simplicity purposes, FIG. 7 includes signaling 700 for only two of the four originating transmitters 610a, 610b and for only two of the four monitoring receivers 650a, 650b of the system 600 of FIG. 6. It should be understood that the diagram of FIG. 7 can include additional signaling for the other originating transmitters 610c, 610d and/or monitoring receivers 650c, 650d of the system 600 of FIG. 6. In addition, the diagram of FIG. 7 may include additional signaling such that at least one monitoring receiver 650a, 650b, 650c, 650d may receive at least one beacon signal 640a, 640b, 640c, 640d that is derived from at least one different original signal 620a, 620b, 620c, 620d than as is shown in FIG. 7 (e.g., monitoring receiver 650b may also receive beacon signal 640a that is derived from original signal 620a).

As shown in FIG. 7, the originating transmitter A 610a may generate and transmit the signal 620a (e.g., original signal), which may be a burst signal, to the beacon device 630. After the beacon device 630 receives the original signal 620a, the beacon device 630 may generate and transmit a signal 640a (e.g., beacon signal) to the monitoring receiver A 650a.

After the monitoring receiver A 650*a* receives the signal 640*a* (e.g., beacon signal), the monitoring receiver A 650*a* may generate and transmit the signal 670*a* (e.g., containing beacon signal properties) to the processing facility 660. The originating transmitter A 610*a* may also generate and transmit the signal 680*a* (e.g., containing original signal properties) to the processing facility 660.

Also, the originating transmitter B 610*b* may generate and transmit the signal 620*b* (e.g., original signal), which may be a burst signal, to the beacon device 630. After the beacon device 630 receives the original signal 620*b*, the beacon device 630 may generate and transmit a signal 640*b* (e.g., beacon signal) to the monitoring receiver B 650*b*.

After the monitoring receiver B 650*b* receives the signal 640*b* (e.g., beacon signal), the monitoring receiver B 650*b* may generate and transmit the signal 670*b* (e.g., containing beacon signal properties) to the processing facility 660. The originating transmitter B 610*b* may also generate and transmit the signal 680*b* (e.g., containing original signal properties) to the processing facility 660.

After the processing facility 660 receives the signals 670*a*, 670*b* and the signals 680*a*, 680*b*, the processing facility 660 may generate and transmit (e.g., to a management facility) a signal 690 containing the location of the beacon device 630.

Figure 8:
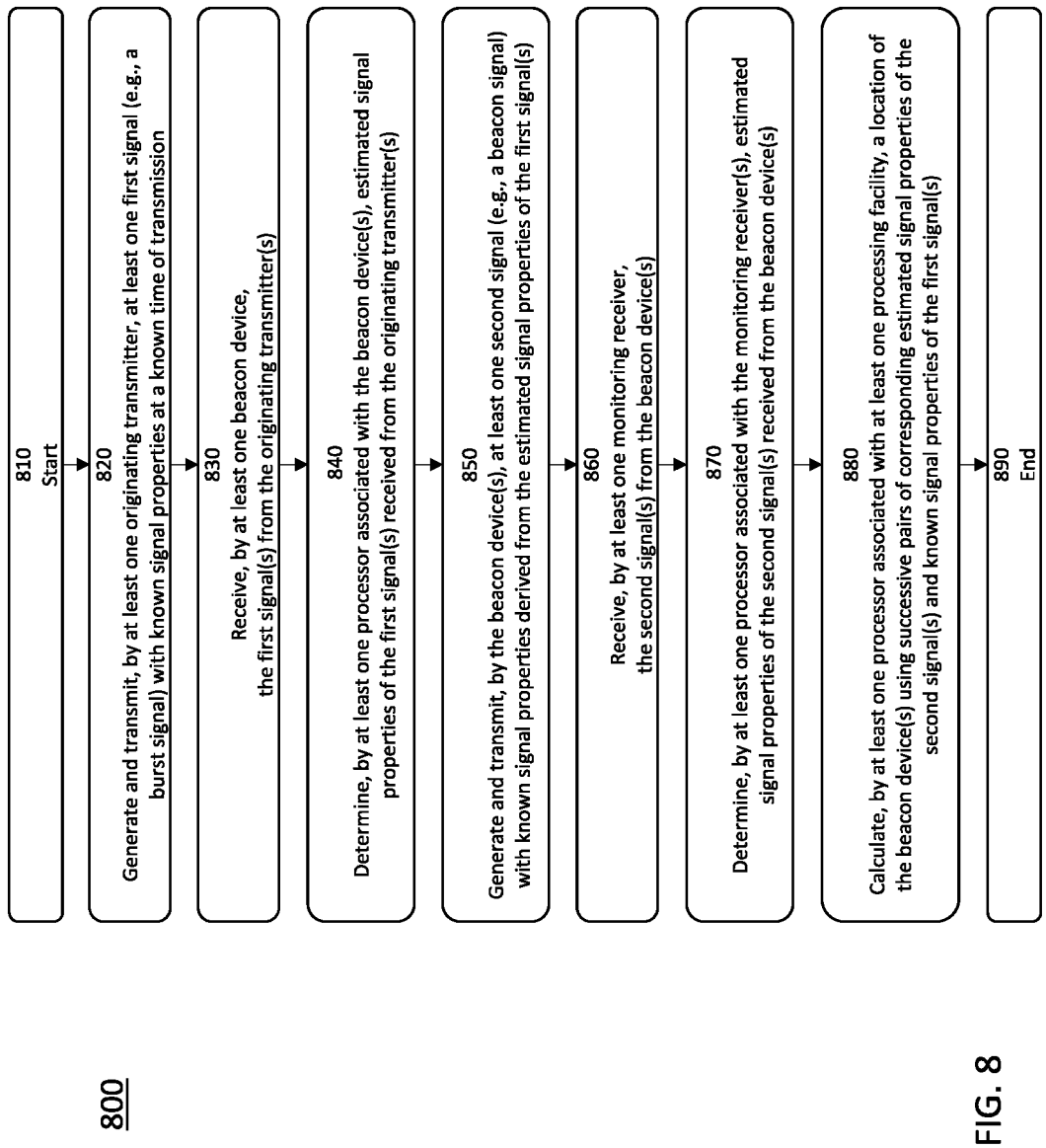
FIG. 8 is a flow chart illustrating an example of the disclosed method for a low CSWAP geolocation capability that utilizes signal characteristics passed through to a backhaul network, in accordance with at least one embodiment of the present disclosure.

FIG. 8 is a flow chart illustrating an example of the disclosed method 800 for a low CSWAP geolocation capability that utilizes signal characteristics passed through to a backhaul network, in accordance with at least one embodiment of the present disclosure. At block 810, the method 800 may start. Then, at block 820, at least one originating transmitter (e.g., originating transmitter 110 of FIG. 1, 610*a*-610*d* of FIG. 6) may generate and transmit at least one first signal (e.g., signal 120 of FIG. 1, 620*a*-620*d* of FIG. 6), which may be a burst signal, with known signal properties at a known time of transmission. At block 830, at least one beacon device (e.g., beacon device 130 of FIG. 1, 630 of FIG. 6) may receive the first signal(s) from the originating transmitter(s). At block 840, at least one processor associated with the beacon device(s) may determine estimated signal properties of the first signal(s) received from the originating transmitter(s). Then, at block 850, the beacon device(s) may generate and transmit at least one second signal (e.g., signal 140 of FIG. 1, 640*a*-640*d* of FIG. 6), which may be referred to as a beacon signal, with known signal properties derived from the estimated signal properties of the first signal(s).

Then, at block 860, at least one monitoring receiver (e.g., monitoring receiver 150 of FIG. 1, 650*a*-650*d* of FIG. 6) may receive the second signal(s) from the beacon device(s). At block 870, at least one processor associated with the monitoring receiver(s) may determine estimated signal properties of the second signal(s) received from the beacon device(s). At block 880, at least one processor associated with at least one processing facility (e.g., processing facility 160 of FIG. 1, 660 of FIG. 6) may calculate a location of the beacon device(s) using successive pairs of corresponding estimated signal properties of the second signal(s) and known signal properties of the first signal(s). Then, the method 800 may end at block 890.

Figure 9:
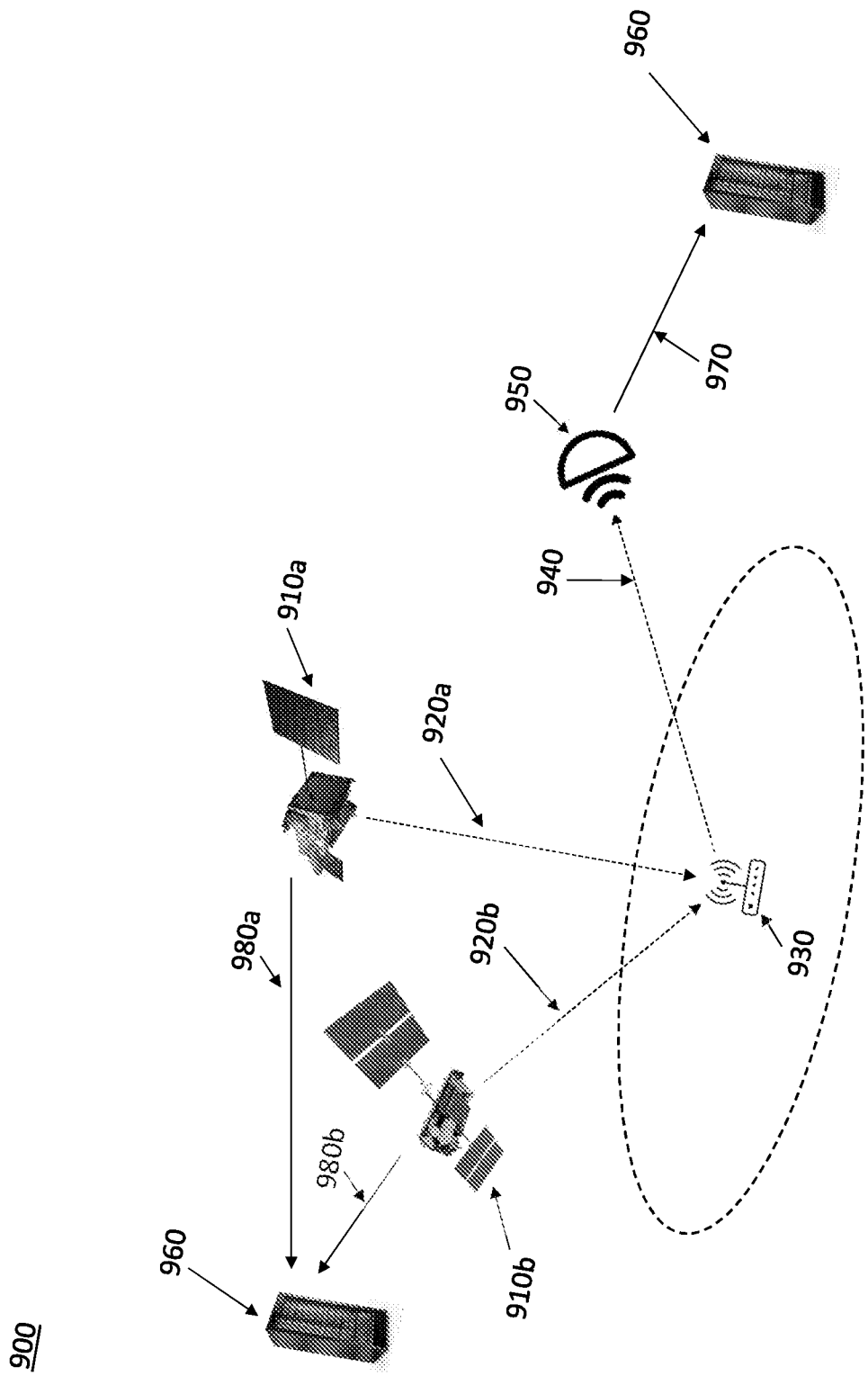
FIG. 9 is a diagram illustrating an example of the disclosed system for a low CSWAP geolocation capability that utilizes signal characteristics passed through to a backhaul network, where the system includes multiple originating transmitters associated with satellites located in different orbits with different altitudes, in accordance with at least one embodiment of the present disclosure.

FIG. 9 is a diagram illustrating an example of the disclosed system 900 for a low CSWAP geolocation capability that utilizes signal characteristics passed through to a backhaul network, where the system 900 includes multiple originating transmitters 910*a*, 910*b* associated with satellites located in different orbits with different altitudes, in accordance with at least one embodiment of the present disclosure. The system 900 of FIG. 9 is similar to the system 100 of FIG. 1, except the system 900 of FIG. 9 has multiple originating transmitters 910*a*, 910*b*, as opposed to only one originating transmitter 110, as is shown in FIG. 1.

In FIG. 9, the system 900 is shown to include four types of hardware components, which may include a beacon device 930 (e.g., a first device), two originating transmitters 910*a*, 910*b* (e.g., second devices), a monitoring receiver 950 (e.g., a third device), and a processing facility 960 (e.g., which may include at least one computer server). Each of these hardware components (e.g., the beacon device 930, originating transmitters 910*a*, 910*b*, monitoring receiver 950, and processing facility 960) may include a transceiver, which can include both a receiver configured to receive EM signals (e.g., RF signals) wirelessly and/or via wire, and a transmitter configured to transmit EM signals (e.g., RF signals) wirelessly and/or via wire. Although the system 900 is shown in FIG. 9 to include two separate processing facilities 960, the system 900 may only include one processing facility 960. In some embodiments, at least one monitoring receiver may complete the processing facility function and, thus, no separate processing facility 960 may be needed.

In at least one embodiment, the system 900 may include multiple of each of the four types of hardware components (e.g., the beacon device 930, originating transmitters 910*a*, 910*b*, monitoring receiver 950, and processing facility 960). For example, in one or more embodiments, the system 900 of FIG. 9 may include hundreds of originating transmitters 910*a*, 910*b*, beacons 930, monitoring receivers 950, and/or processing facilities 960. For example, as shown in FIG. 9, the system 900 may include multiple (e.g., two) originating transmitters 910*a*, 910*b*. In one or more embodiments, the hardware components (e.g., beacon device 930, originating transmitters 910*a*, 910*b*, monitoring receiver 950, and processing facility 960) of the system 900 can operate in a number of different environments (e.g., a space, air, terrestrial, and/or marine, such as ocean, environment).

In some embodiments, the originating transmitters 910*a*, 910*b* and/or the monitoring receiver 950 may be associated with a satellite, which may be a LEO, MEO, and/or GEO satellite (e.g., a geostationary satellite). In some embodiments, the originating transmitters 910*a*, 910*b* and/or the monitoring receiver 950 may be associated with a satellite within a NE-GNSS constellation.

In one or more embodiments, the originating transmitters 910*a*, 910*b* and/or monitoring receiver 950 may be associated with satellites in different orbits and/or in different satellite constellations. For example, the originating transmitter 910*a* may be associated with a MEO satellite, and the originating transmitter 910*b* may be associated with a LEO satellite. For another example, the originating transmitter 910*a* may be associated with a satellite within one satellite constellation (e.g., a satellite within the SpaceX satellite constellation), and the originating transmitter 910*b* may be associated with a satellite within a different satellite constellation (e.g., a satellite within the Iridium satellite constellation).

It should be noted that, the system 900 may employ, for the originating transmitters 910*a*, 910*b* and/or the monitoring receiver 950, a combination of satellites in different orbital constellations, satellite constellations, and/or individual satellite deployments as transmitters and/or receivers. The number and/or size of satellites employed by the system 900 may vary, which may be dependent upon the orbit of the satellites, the primary missions of the satellites, and/or the use cases for the satellites. In one or more embodiments, the system 900 may include traditional GNSS satellites as well as a variety of other satellite configurations (e.g., satellite configurations including Iridium satellites and/or satellites from other satellite constellations, such as Kuiper, OneWeb, SpaceX, and/or Small/Cube/Micro/SpaceBEE). In some embodiments, various combinations of satellites, such as SpaceX satellites and/or SpaceBEE satellites, may be employed by the disclosed system 900.

In one or more embodiments, the beacon device 930 may be associated with a device that may be associated with a user, such as a smart phone (e.g., beacon device 1330 of FIG. 13), a computing device, a smart watch, virtual reality glasses, or a vehicle (e.g., beacon device 1130a of FIG. 11). In some embodiments, the processing facility 960 may be associated with a building (e.g., an operation center), which may include at least one computing device, such as a computer server.

The system 900 may include four communications paths, which may include a communication path for the transmission of signals 920a, 920b (e.g., which may be referred to as a first signals and/or an original signals) from the originating transmitters 910a, 910b to the beacon device 930, a communication path for the transmission of a signals 980a, 980b from the originating transmitters 910a, 910b to the processing facility 960, a communication path for the transmission of the signal 940 (e.g., which may be referred to as a second signal and/or a beacon signal) from the beacon device 930 to the monitoring receiver 950, and a communication path for the transmission of the signal 970 from the monitoring receiver 950 to the processing facility 960. In some embodiments, the signals 920a, 920b, 980a, 980b, 940, and/or 970 are EM signals (e.g., RF signals). In at least one embodiment, the signals 920a, 920b, 980a, 980b, 940, and/or 970 may each be in the form of a burst signal, which may contain data packets. It should be noted that in at least one embodiment, one or more of the signals 920a, 920b, 940, 980a, 980b, 970 may be transmitted wirelessly and/or via wire.

To enable a low CSWAP beacon device (e.g., beacon device 930) with vast improvements to position convergence times and position accuracies, the power and hardware resources typically used for signal processing and position/navigation processing can be off-loaded to a processing facility (e.g., processing facility 960). In order to accomplish adequate convergence times and position calculations, the processing facility 960 may require information about the original transmission signals (e.g., signals 920a, 920b), which may be burst signals, and details of the beacon signal (e.g., signal 940) as it is received by the monitoring receiver 950. The processing facility 960, free of power and hardware constraints, can utilize all the original signal (e.g., signals 920a, 920b) and the beacon signal (e.g., signal 940) transmission information to calculate the position of the beacon 930. In some embodiments, the beacon 930 may offload some of the processing to multiple entities, such as a device coupled with the beacon 930 and/or the processing facility 960.

During operation of the system 900 of FIG. 9, the originating transmitters 910a, 910b may generate and transmit (e.g., wirelessly) the signals 920a, 920b (e.g., original signal) to the beacon device 930. The signals 920a, 920b may be EM signals (e.g., RF signals), and may be in the form of burst signals, which may also include a plurality of data packets. In some embodiments, the signals 920a, 920b may have a unique identifying signature, which may be encoded in the data of the signals 920a, 920b. In one or more embodiments, the transmission of the signals 920a, 920b by the originating transmitters 910a, 910b can occur at a known time (e.g., a time known by the originating transmitters 910a, 910b). In some embodiments, the location and velocity of the originating transmitters 910a, 910b may be known at the time of the transmission of the signals 920a, 920b (e.g., the originating transmitters 910a, 910b knows its location and velocity at the time of transmission of the signals 920a, 920b).

After the signals 920a, 920b have been transmitted to the beacon device 930 by the originating transmitters 910a, 910b, the beacon device 930 can receive the signals 920a, 920b. After the beacon device 930 receives the signals 920a, 920b from the originating transmitters 910a, 910b, the beacon device 1930 may determine (measure) estimated signal properties of the received signals 920a, 920b. It should be noted that all measurements of the signal properties are inherently estimates due to precision and accuracy errors. In one or more embodiments, the estimated signal properties of the signals 920a, 920b may include, but are not limited to, a center frequency of the signals 920a, 920b, a modulation of the signals 920a, 920b, a TOA of the signals 920a, 920b at the beacon device 930, a signal power of the signals 920a, 920b, a signal quality (e.g., SNR and/or C/No) of the signals 920a, 920b, a Doppler (e.g., phase shift indicative of motion) of the signals 920a, 920b, and/or at least one unique identifying property (e.g., encoded data sequence and/or PRN code) of the signals 920a, 920b.

After the beacon device 930 determines the estimated signal properties of the received signals 920a, 920b, the beacon device 930 may generate a signal 940 (e.g., a beacon signal) based on (e.g., derived from and/or dependent upon) the estimated signal properties of the received signals 920a, 920b (e.g., based on an average of the estimated signal properties of the received signals 920a, 920b). In one or more embodiments, the signal 940 will be generated based on (e.g., derived from and/or dependent upon) at least one of the received signals 920a, 920b (e.g., at least one of the original signals). In one or more embodiments, the signal 940 may be an EM signal (e.g., an RF signal). The signal 940 can be in the form of a burst signal, which include a plurality of data packets. In some embodiments, the signal 940 may have a unique identifying signature, which can be encoded in the data of the signal 940.

After the beacon device 930 generates the signal 940, the beacon device 930 can transmit (e.g., wirelessly) the signal 940 (e.g., the beacon signal) to the monitoring receiver 950. In some embodiments, the beacon device 930 may transmit the signal 940 after a fixed time delay, or at a predefined time cadence, after the receiving of one or both of the signals 920a, 920b. After the monitoring receiver 950 receives the signal 940, the monitoring receiver 950 can determine (measure) estimated signal properties of the received signal 940. In one or more embodiments, the estimated signal properties of the received signal 940 may include, but are not limited to, a center frequency of the signal 940, a frequency offset of the signal 940, a modulation of the signal 940, a TOA of the signal 940 at the monitoring receiver 950, a position and velocity of the monitoring receiver 950 at the time of arrival of the signal 940 at the monitoring receiver 950, a time offset of the signal 940, a signal power of the signal 940, a signal quality (e.g., SNR and/or C/No) of the signal 940, a Doppler (e.g., phase shift indicative of motion) of the signal 940, and/or at least one unique identifying property (e.g., encoded data sequence and/or PRN code) of the signal 940.

After the monitoring receiver 950 has determined the estimated signal properties of the signal 940, the monitoring receiver 950 can generate and transmit (e.g., wirelessly and/or via wire) a signal 970 to the processing facility 960. The signal 970 may include at least a subset of the signal properties (which may include at least some estimated signal properties) of the signal 940, which may at least include the TOA of the signal 940 at the monitoring receiver 950, and a location (position) and velocity of the monitoring receiver 950 at the time of arrival of the signal 940 at the monitoring receiver 950. Also, the originating transmitters 910*a*, 910*b* may generate and transmit (e.g., wirelessly and/or via wire) signals 980*a*, 980*b* to the processing facility 960. The signals 980*a*, 980*b* may include at least at subset of signal properties (which may include at least some estimated signal properties) of the signals 920*a*, 920*b*, which may at least include a time of transmission of the signals 920*a*, 920*b* from the originating transmitters 910*a*, 910*b* to the beacon device 930, and a location (position) and velocity of the originating transmitters 910*a*, 910*b* at the time of the transmission of the signals 920*a*, 920*b* to the beacon device 930.

After the processing facility 960 has received the signal 970 from the monitoring receiver 950 and the signals 980*a*, 980*b* from the originating transmitters 910*a*, 910*b*, the processing facility 960 may perform geolocation of the beacon device 930 by determining the location (position) of the beacon device 930 based on (utilizing) the data included within the signal 970 (e.g., the TOA of the signal 940 at the monitoring receiver 950, and a location (position) and velocity of the monitoring receiver 950 at the time of arrival of the signal 940 at the monitoring receiver 950) and the data included within the signals 980*a*, 980*b* (e.g., the time of transmission of the signals 920*a*, 920*b* from the originating transmitters 910*a*, 910*b* to the beacon device 930, and the location (position) and velocity of the originating transmitters 910*a*, 910*b* at the time of the transmission of the signals 920*a*, 920*b* to the beacon device 930).

After the processing facility 960 has determined the location (position) of the beacon device 930, the processing facility 960 may transmit the location to the beacon device 930. It should be noted that, in one or more embodiments, the monitoring receiver 950 may perform the geolocation of the beacon device 930 instead of, or in conjunction with, the processing facility 960. For these cases, the monitoring receiver 950 can receive, from the originating transmitters 910*a*, 910*b*, the signals 980*a*, 980*b*, which may include the time of transmission of the signals 920*a*, 920*b* from the originating transmitters 910*a*, 910*b* to the beacon device 930, and the location (position) and velocity of the originating transmitters 910*a*, 910*b* at the time of the transmission of the signals 920*a*, 920*b* to the beacon device 930.

Figure 10:
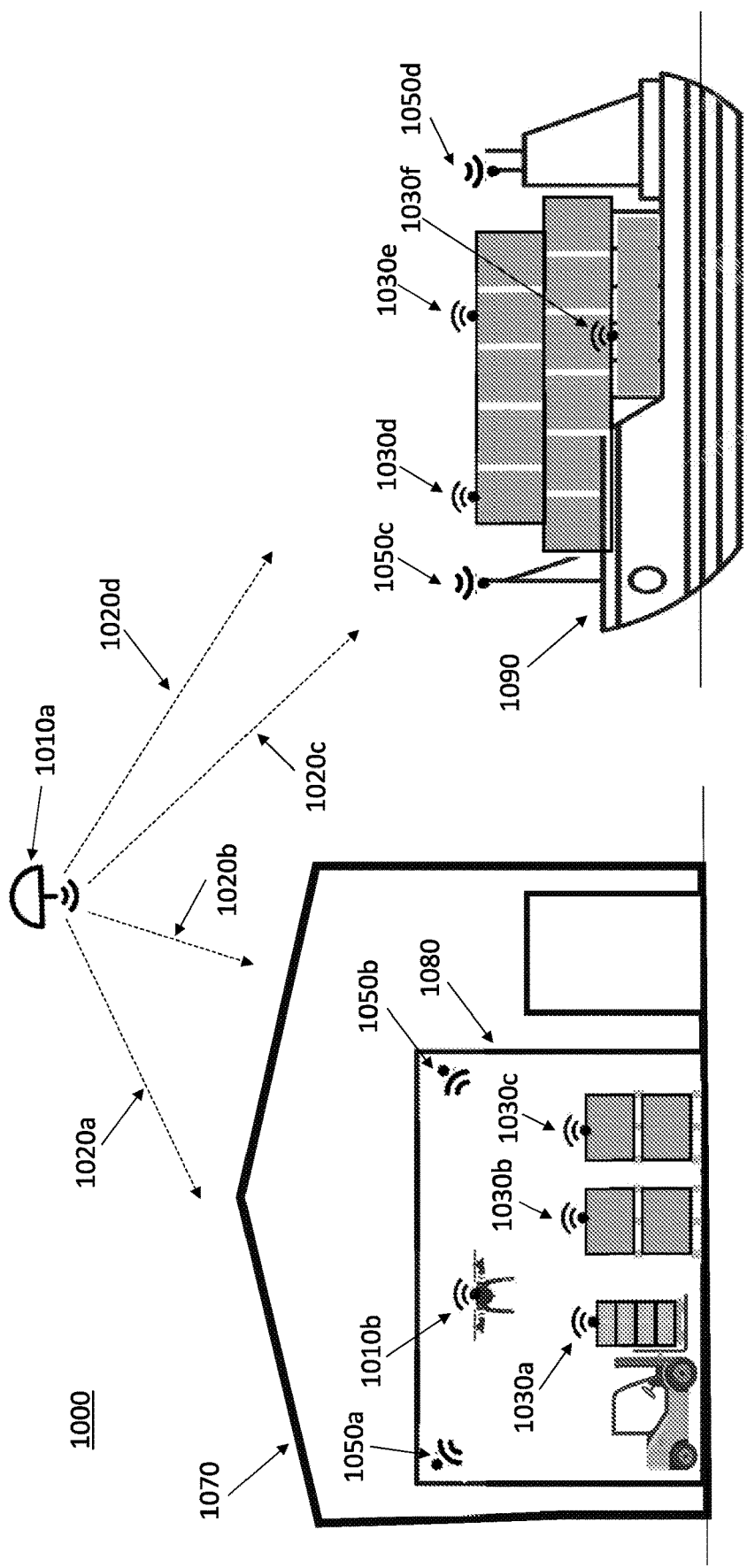
FIG. 10 is a diagram illustrating an example of the disclosed system for a low CSWAP geolocation capability that utilizes signal characteristics passed through to a backhaul network, where the system may be employed for asset tracking and supply chain management, in accordance with at least one embodiment of the present disclosure.

FIG. 10 is a diagram illustrating an example of the disclosed system 1000 for a low CSWAP geolocation capability that utilizes signal characteristics passed through to a backhaul network, where the system 1000 may be employed for asset tracking and supply chain management, in accordance with at least one embodiment of the present disclosure. The system 1000 of FIG. 10 is similar to the system 600 of FIG. 6, where both systems 1000, 600 may comprise multiple originating transmitters (e.g., originating transmitters 610*a*, 610*b*, 610*c*, 610*d* of FIG. 6, and originating transmitters 1010*a*, 1010*b* of FIG. 10), and comprise multiple monitoring receivers (e.g., monitoring receivers 650*a*, 650*b*, 650*c*, 650*d* of FIG. 6, and monitoring receivers 1050*a*, 1050*b*, 1050*c*, 1050*d* of FIG. 10).

In particular, the system 1000 of FIG. 10 includes multiple beacon devices 1030*a*, 1030*b*, 1030*c*, 1030*d*, 1030*e*, 1030*f* associated with (e.g., attached to or located within) various different items (e.g., assets, such as shipping containers) for indoor asset tracking and ocean-based asset tracking for supply chain management. Specifically, beacon devices 1030*a*, 1030*b*, 1030*c* are associated with items (e.g., assets) located inside of a building 1070 for indoor asset tracking for supply chain management for the building 1070. And, beacon devices 1030*d*, 1030*e*, 1030*f* are associated with items (e.g., assets) located on a boat 1090 for ocean-based asset tracking for supply chain management for the boat 1090.

In FIG. 10, the system 1000 is shown to include three types of hardware components, which may include multiple beacon devices 1030*a*, 1030*b*, 1030*c*, 1030*d*, 1030*e*, 1030*f* (e.g., first devices), two originating transmitters 1010*a*, 1010*b* (e.g., second devices), and multiple monitoring receivers 1050*a*, 1050*b*, 1050*c*, 1050*d* (e.g., third devices). The system may also include a fourth type of hardware component of at least one processing facility (not shown in FIG. 10, but similar to processing facility 690 of FIG. 6), which may include at least one computer server. Each of these types of hardware components (e.g., the beacon devices 1030*a*, 1030*b*, 1030*c*, 1030*d*, 1030*e*, 1030*f*; the originating transmitters 1010*a*, 1010*b*, the monitoring receivers 1050*a*, 1050*b*, 1050*c*, 1050*d*, and at least one processing facility) may include a transceiver, which can include both a receiver configured to receive EM signals, such as RF signals, wirelessly and/or via wire, and a transmitter configured to transmit EM signals, such as RF signals, wirelessly and/or via wire.

In some embodiments, the originating transmitter 1010*a* may be associated with a satellite, which may be a LEO, MEO, and/or GEO satellite (e.g., a geostationary satellite). In some embodiments, the originating transmitter 1010*a* may be associated with a satellite within a satellite constellation, such as the NE-GNSS, Kuiper, OneWeb, SpaceX, and/or Small/Cube/Micro/SpaceBEE satellite constellation. In at least one embodiment, the originating transmitter 1010*b* may be associated with a drone (e.g., with a calibrated position and accurate timing) located within the building 1070.

In one or more embodiments, the monitoring receivers 1050*a*, 1050*b* may be associated with the building 1070. For example, the monitoring receivers 1050*a*, 1050*b* may be mounted within (e.g., inside of) the building 1070 such that the monitoring receivers 1050*a*, 1050*b* are capable of receiving signals (e.g., beacon signals) transmitted from the beacon devices 1030*a*, 1030*b*, 1030*c* located in the building 1070. In at least one embodiment, the monitoring receivers 1050*c*, 1050*d* may be associated with the boat 1090. For example, the monitoring receivers 1050*c*, 1050*d* may be mounted on (or within) the boat 1090 such that the monitoring receivers 1050*c*, 1050*d* are capable of receiving signals (e.g., beacon signals) transmitted from the beacon devices 1030*d*, 1030*e*, 1030*f* located on the boat 1090.

The system 1000 of FIG. 10 can operate similarly to the system 600 of FIG. 6 to determine the locations (positions) of the beacon devices 1030*a*, 1030*b*, 1030*c*, 1030*d*, 1030*e*, 1030*f* For example, during operation of the system 1000 of FIG. 10, the originating transmitters 1010*a*, 1010*b* may generate and transmit (e.g., wirelessly) signals (e.g., original signals) (e.g., the originating transmitter 1010*a* transmits signals 1020*a*, 1020*b*, 1020*c*, 1020*d*) towards the beacon devices 1030*a*, 1030*b*, 1030*c*, 1030*d*, 1030*e*, 1030*f*. In one or more embodiments, the beacon devices 1030*a*, 1030*b*, 1030*c* located within the building 1070 may receive the signals (e.g., original signals) transmitted from both of the originating transmitters 1010*a*, 1010*b*. In at least one embodiment, the beacon devices 1030*d*, 1030*e*, 1030*f* located on the boat 1090 may receive the signals (e.g., original signals) from the originating transmitter 1010a, which may be associated with a satellite.

After the beacon devices 1030a, 1030b, 1030c, 1030d, 1030e, 1030f have received the signals (e.g., original signals) transmitted from the originating transmitters 1010a, 1010b, the beacon devices 1030a, 1030b, 1030c, 1030d, 1030e, 1030f may determine (e.g., measure) estimated signal properties of the received signals (e.g., original signals). Then, the beacon devices 1030a, 1030b, 1030c, 1030d, 1030e, 1030f may generate signals (e.g., beacon signals) based on the estimated signal properties of the received signals (e.g., original signals). After the beacon devices 1030a, 1030b, 1030c, 1030d, 1030e, 1030f have generated the signals (e.g., beacon signals), the beacon devices 1030a, 1030b, 1030c, 1030d, 1030e, 1030f may transmit the signals (e.g., beacon signals) towards the monitoring receivers 1050a, 1050b, 1050c, 1050d.

After the beacon devices 1030a, 1030b, 1030c, 1030d, 1030e, 1030f have transmitted the signals (e.g., beacon signals), the monitoring receivers 1050a, 1050b, 1050c, 1050d may receive the signals (e.g., beacon signals) from the beacon devices 1030a, 1030b, 1030c, 1030d, 1030e, 1030f. In one or more embodiments, within the building 1070, the monitoring receivers 1050a, 1050b may receive the signals (e.g., beacon signals) from the beacon devices 1030a, 1030b, 1030c. In at least one embodiment, on the boat 1090, the monitoring receivers 1050c, 1050d may receive the signals (e.g., beacon signals) from the beacon devices 1030d, 1030e, 1030f.

After the monitoring receivers 1050a, 1050b, 1050c, 1050d have received the signals (e.g., beacon signals) transmitted from the beacon devices 1030a, 1030b, 1030c, 1030d, 1030e, 1030f, the monitoring receivers 1050a, 1050b, 1050c, 1050d may determine (e.g., measure) estimated signal properties of the received signals (e.g., beacon signals). Then, the monitoring receivers 1050a, 1050b, 1050c, 1050d may generate signals based on the estimated signal properties of the received signals (e.g., beacon signals). After the monitoring receivers 1050a, 1050b, 1050c, 1050d have generated the signals, the monitoring receivers 1050a, 1050b, 1050c, 1050d may transmit the signals towards at least one processing facility for processing to determine the locations of the beacon devices 1030a, 1030b, 1030c, 1030d, 1030e, 1030f. It should be noted that, in one or more embodiments, the monitoring receivers 1050a, 1050b, 1050c, 1050d themselves may perform processing to determine the locations of the beacon devices 1030a, 1030b, 1030c, 1030d, 1030e, 1030f.

FIG. 11 is a diagram illustrating an example of the disclosed system 1100 for a low CSWAP geolocation capability that utilizes signal characteristics passed through to a backhaul network, where the system 1100 may be employed for regulatory purposes, in accordance with at least one embodiment of the present disclosure. The system 1100 of FIG. 11 is similar to the system 100 of FIG. 1, where both systems 1100, 100 may comprise a single originating transmitter (e.g., originating transmitter 110 of FIG. 1, and originating transmitter 1110 of FIG. 11), and comprise a single monitoring receiver (e.g., monitoring receiver 150 of FIG. 1, and monitoring receiver 1150 of FIG. 11).

In particular, the system 1100 of FIG. 11 includes multiple beacon devices 1130a, 1130b, 1130c, 1130d associated with (e.g., attached to or located within) various different mobile items. Specifically, beacon devices 1130a, 1130b, 1130c, 1130d are associated various different types of mobile vehicles. In one or more embodiments, beacon device 1130a may be associated with an autonomous vehicle, beacon device 1130b may be associated with an autonomous robotic dog, beacon device 1130c may be associated with an autonomous robotic vehicle, and beacon device 1130d may be associated with a drone. In one or more embodiments, the system 1110 may determine the locations (positions) of the beacon devices 1130a, 1130b, 1130c, 1130d for various different regulatory purposes, which may include purposes related to, but not limited to, registration, licensing, tracking, identification, monitoring, management, traffic enforcement, safety inspection, tolling, polling, insurance, and/or liability.

In FIG. 11, the system 1100 is shown to include three types of hardware components, which may include multiple beacon devices 1130a, 1130b, 1130c, 1130d (e.g., first devices), an originating transmitter 1110 (e.g., a second device), and a monitoring receiver 1150 (e.g., a third device). The system 1100 may also include a fourth type of hardware component of at least one processing facility (not shown in FIG. 11, but similar to processing facility 690 of FIG. 6), which may include at least one computer server. Each of these types of hardware components (e.g., the beacon devices 1130a, 1130b, 1130c, 1130d, the originating transmitter 1110, the monitoring receiver 1150, and at least one processing facility) may include a transceiver, which can include both a receiver configured to receive EM signals, such as RF signals, wirelessly and/or via wire, and a transmitter configured to transmit EM signals, such as RF signals, wirelessly and/or via wire.

In one or more embodiments, the originating transmitter 1110 may be associated with a satellite, which may be a LEO, MEO, and/or GEO satellite (e.g., a geostationary satellite). In some embodiments, the originating transmitter 1110 may be associated with a satellite within a satellite constellation, such as the NE-GNSS, Kuiper, OneWeb, SpaceX, and/or Small/Cube/Micro/SpaceBEE satellite constellation.

In one or more embodiments, the monitoring receiver 1150 may be associated with a smart infrastructure, such as a smart stop light. For example, the monitoring receiver 1150 may be mounted on or within (e.g., inside of) the smart infrastructure such that the monitoring receiver 1150 is capable of receiving signals (e.g., beacon signals) transmitted from the beacon devices 1130a, 1130b, 1130c, 1130d.

The system 1100 of FIG. 11 may operate similarly to the system 100 of FIG. 1 to determine the locations (positions) of the beacon devices 1130a, 1130b, 1130c, 1130d. For example, during operation of the system 1100 of FIG. 11, the originating transmitter 1110 may generate and transmit (e.g., wirelessly) a signal 1120 (e.g., an original signal) towards the beacon devices 1130a, 1130b, 1130c, 1130d. In one or more embodiments, the beacon devices 1130a, 1130b, 1130c, 1130d may receive the signal 1120 (e.g., the original signal) transmitted from the originating transmitter 1110.

After the beacon devices 1130a, 1130b, 1130c, 1130d have received the signal 1120 (e.g., the original signal) transmitted from the originating transmitter 1110, the beacon devices 1130a, 1130b, 1130c, 1130d may determine (e.g., measure) estimated signal properties of the received signal 1120 (e.g., the original signal). Then, the beacon devices 1130a, 1130b, 1130c, 1130d may generate signals 1140a, 1140b, 1140c, 1140d (e.g., beacon signals) based on the estimated signal properties of the received signal 1120 (e.g., the original signal). After the beacon devices 1130a, 1130b, 1130c, 1130d have generated the signals 1140a, 1140b, 1140c, 1140d (e.g., the beacon signals), the beacon devices 1130a, 1130b, 1130c, 1130d may transmit the signals 1140a, 1140b, 1140c, 1140d (e.g., beacon signals) towards the monitoring receiver 1150. After the beacon devices 1130a, 1130b, 1130c, 1130d have transmitted the signals 1140a, 1140b, 1140c, 1140d (e.g., the beacon signals), the monitoring receiver 1150 may receive the signals 1140a, 1140b, 1140c, 1140d (e.g., the beacon signals) from the beacon devices 1130a, 1130b, 1130c, 1130d.

After the monitoring receiver 1150 has received the signals 1140a, 1140b, 1140c, 1140d (e.g., beacon signals) transmitted from the beacon devices 1130a, 1130b, 1130c, 1130d, the monitoring receiver 1150 may determine (e.g., measure) estimated signal properties of the received signals 1140a, 1140b, 1140c, 1140d (e.g., beacon signals). Then, the monitoring receiver 1150 may generate at least one signal based on the estimated signal properties of the received signals 1140a, 1140b, 1140c, 1140d (e.g., beacon signals). After the monitoring receiver 1150 has generated at least one signal, the monitoring receiver 1150 may transmit the signal(s) towards at least one processing facility for processing to determine the locations of the beacon devices 1130a, 1130b, 1130c, 1130d. It should be noted that, in one or more embodiments, the monitoring receiver 1150 may perform the processing to determine the locations of the beacon devices 1130a, 1130b, 1130c, 1130d.

In one or more embodiments, it should be noted that, as autonomous systems become more prevalent, the need to regulate autonomous vehicles (e.g., driverless vehicles, such as the vehicle associated with the beacon device 1130a), and even traditional manned vehicles, as part of a larger system of nodes will become more critical and require an improved means to support a cooperative network of connected and/or unconnected nodes. In at least one embodiment, a beacon device (e.g., beacon device 1130a) may be embedded, coupled to, or otherwise integrated within an autonomous vehicle. In some embodiments, a monitoring receiver (e.g., monitoring receiver 1150) can be similarly embedded, coupled to, or otherwise integrated into an infrastructure (e.g., a smart stop light) that is able to be used for regulatory purposes. Regulatory purposes can include, but are not limited to, purposes related to registration, licensing, tracking, identification, monitoring, management, traffic enforcement, safety inspection, tolling, polling, insurance, liability, and so forth.

In one or more examples, an autonomous vehicle (e.g., the vehicle associated with beacon device 1130a) can send information (e.g., a remote session identification (ID)) with other information to the infrastructure that contains a monitoring receiver (e.g., the smart stop light associated with monitoring receiver 1150), such that the location of the vehicle (e.g., the vehicle associated with beacon device 1130a) can be monitored. Further, in this example, beacon devices can be utilized as smart "license plates" for unmanned aerial vehicles (UAVs) (e.g., the drone associated with beacon device 1130d) to assist with providing accountability of operators of these assets. In some embodiments, a monitoring receiver (e.g., monitoring receiver 1150) can be part of a larger system that may be part of a smart infrastructure, such as that within a city, state, country, other regulated region or complex. In one or more embodiments, the monitoring receiver (e.g., monitoring receiver 1150) can be used for cybersecurity, privacy, and safety reasons (e.g., ability to engage or disengage autonomous nodes).

Figure 12:
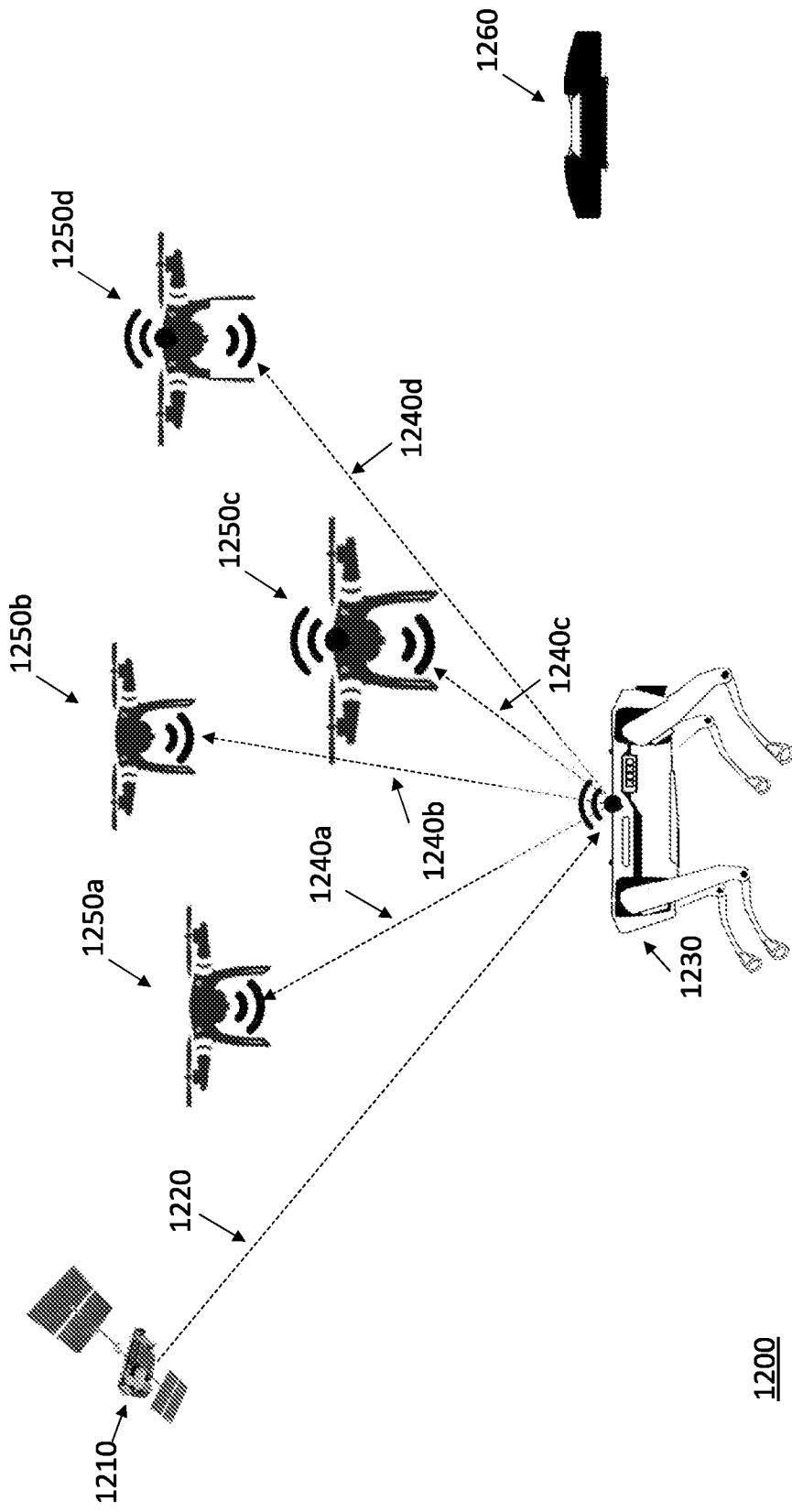
FIG. 12 is a diagram illustrating an example of the disclosed system for a low CSWAP geolocation capability that utilizes signal characteristics passed through to a backhaul network, where the system may be employed for geolocation of a beacon associated with a roving robotic sentry dog, in accordance with at least one embodiment of the present disclosure.

FIG. 12 is a diagram illustrating an example of the disclosed system 1200 for a low CSWAP geolocation capability that utilizes signal characteristics passed through to a backhaul network, where the system 1200 may be employed for geolocation of a beacon 1230 (e.g., a transceiver) associated with a roving robotic sentry dog, in accordance with at least one embodiment of the present disclosure. The system 1200 of FIG. 12 is similar to the system 100 of FIG. 1, where both systems 1200, 100 may comprise a single originating transmitter (e.g., originating transmitter 110 of FIG. 1, and originating transmitter 1210 of FIG. 11).

In particular, the system 1200 of FIG. 12 includes a single beacon device 1230 associated with (e.g., attached to or located within) a robotic sentry dog, which may roam freely to monitor the surrounding environment. In one or more embodiments, the system 1200 may determine the location (position) of the beacon device 1230 associated with the robotic sentry dog for various different monitoring purposes, including military scouting purposes. In one or more embodiments, the system 1200 may include more than one beacon device, where each beacon device may be associated with a robotic sentry dog.

In FIG. 12, the system 1100 is shown to include four types of hardware components, which may include a single beacon device 1230 (e.g., a first device), an originating transmitter 1210 (e.g., a second device), a plurality of monitoring receivers 1250a, 1250b, 1250c, 1250d (e.g., third devices), and docking station 1260, which may include at least one processor and/or at least one computer server. In some embodiments, the docking station 1260 may also have other purposes, such as to allow the monitoring receivers 1250a, 1250b, 1250c, 1250d to charge, or replace their energy source (e.g., charging their batteries). Each of these types of hardware components (e.g., the beacon device 1230, the originating transmitter 1210, the monitoring receivers 1250a, 1250b, 1250c, 1250d, and the docking station 1260) may include a transceiver, which can include both a receiver configured to receive EM signals, such as RF signals, wirelessly and/or via wire, and a transmitter configured to transmit EM signals, such as RF signals, wirelessly and/or via wire.

In one or more embodiments, the originating transmitter 1210 may be associated with a satellite, which may be a LEO, MEO, and/or GEO satellite (e.g., a geostationary satellite). In at least one embodiment, the originating transmitter 1210 may be associated with a satellite within a satellite constellation (e.g., the NE-GNSS, Kuiper, OneWeb, SpaceX, and/or Small/Cube/Micro/SpaceBEE satellite constellation).

In one or more embodiments, the monitoring receivers 1250a, 1250b, 1250c, 1250d may each be associated with a drone, which may include at least one processor. For example, the monitoring receivers 1250a, 1250b, 1250c, 1250d may be mounted on or within (e.g., inside of) the drones. In one or more embodiments, the drones associated with the monitoring receivers 1250a, 1250b, 1250c, 1250d may dock on the docking station 1260 to download data to and/or upload data from the docking station 1260. In some embodiments, the drones associated with the monitoring receivers 1250a, 1250b, 1250c, 1250d may dock on the docking station 1260 to obtain charge (power) from the docking station 1260.

The system 1200 of FIG. 12 can operate similarly to the system 100 of FIG. 1 to determine the locations (positions) of the beacon device 1230. For example, during operation of the system 1200, the originating transmitter 1210 may generate and transmit (e.g., wirelessly) a signal 1220 (e.g., an original signal) towards the beacon device 1230. Then, the beacon device 1230 may receive the signal 1220 (e.g., the original signal) transmitted from the originating transmitter 1210.

After the beacon device 1230 has received the signal 1220 (e.g., the original signal) transmitted from the originating transmitter 1210, the beacon device 1230 may determine (e.g., measure) estimated signal properties of the received signal 1220 (e.g., the original signal). The beacon device 1230 may then generate signals 1240*a*, 1240*a*, 1240*c*, 1240*d* (e.g., beacon signals) based on the estimated signal properties of the received signal 1220 (e.g., the original signal). After the beacon device 1230 has generated the signals 1240*a*, 1240*a*, 1240*c*, 1240*d* (e.g., the beacon signals), the beacon device 1230 may transmit the signals 1240*a*, 1240*a*, 1240*c*, 1240*d* (e.g., beacon signals) towards the monitoring receivers 1250*a*, 1250*b*, 1250*c*, 1250*d*. It should be obvious, but may be important to note, that this system 1200 could be simplified. For example, in one or more embodiments, not all monitoring receivers 1250*a*, 1250*b*, 1250*c*, 1250*d* and their associated signals are required to support a beacon device 1230. This is just one example arrangement.

After the beacon device 1230 has transmitted the signals 1240*a*, 1240*a*, 1240*c*, 1240*d* (e.g., the beacon signals), the monitoring receivers 1250*a*, 1250*b*, 1250*c*, 1250*d* may receive the signals 1240*a*, 1240*a*, 1240*c*, 1240*d* (e.g., the beacon signals) from the beacon device 1230. After the monitoring receivers 1250*a*, 1250*b*, 1250*c*, 1250*d* have received the signals 1240*a*, 1240*a*, 1240*c*, 1240*d* (e.g., beacon signals) transmitted from the beacon device 1230, the monitoring receivers 1250*a*, 1250*b*, 1250*c*, 1250*d* may determine (e.g., measure) estimated signal properties of the received signals 1240*a*, 1240*a*, 1240*c*, 1240*d* (e.g., beacon signals). Then, the monitoring receivers 1250*a*, 1250*b*, 1250*c*, 1250*d* may generate at least one signal based on the estimated signal properties of the received signals 1240*a*, 1240*a*, 1240*c*, 1240*d* (e.g., beacon signals). After the monitoring receivers 1250*a*, 1250*b*, 1250*c*, 1250*d* have generated at least one signal, at least one of the monitoring receivers 1250*a*, 1250*b*, 1250*c*, 1250*d* may transmit the signal(s) towards the docking station 1260 (and/or towards a processing facility) for processing to determine the locations of the beacon device 1230. It should be noted that, in some embodiments, at least one of the monitoring receivers 1250*a*, 1250*b*, 1250*c*, 1250*d* may perform the processing to determine the location of the beacon device 1230.

In one or more embodiments, also during operation, the robotic sentry dog associated with the beacon device 1230, may roam to monitor and observe the environment. While the robotic sentry dog is roaming, sensors (e.g., cameras, radar, and/or light detection and ranging (LIDAR)) on the robotic sentry dog may obtain observation data (e.g., images and/or video) regarding the surrounding environment. The robotic sentry dog may attach at least one timestamp (e.g., relating to the time(s) that the data was obtained) to the observation data. The robotic sentry dog may transmit this observation data (e.g., including the timestamp(s)) to its associated beacon device 1230. In one or more embodiments, the beacon device 1230 may include this observation data (e.g., including the timestamp(s)) in the beacon signals 1240*a*, 1240*a*, 1240*c*, 1240*d*, which are transmitted towards the monitoring receivers 1250*a*, 1250*b*, 1250*c*, 1250*d* associated with the drones.

After the monitoring receivers 1250*a*, 1250*b*, 1250*c*, 1250*d* receive the beacon signals 1240*a*, 1240*a*, 1240*c*, 1240*d* containing this observation data, at least one of the drones associated with the monitoring receivers 1250*a*, 1250*b*, 1250*c*, 1250*d* may dock on the docking station 1260, and download the observation data onto the docking station 1260. In one or more embodiments, after the docking station 1260 receives the observation data (e.g., including the related timestamp(s)), the docking station 1260 may process the observation data and determine the location of the robotic sentry dog at the time of the timestamp(s) attached to the observation data.

Figure 13:
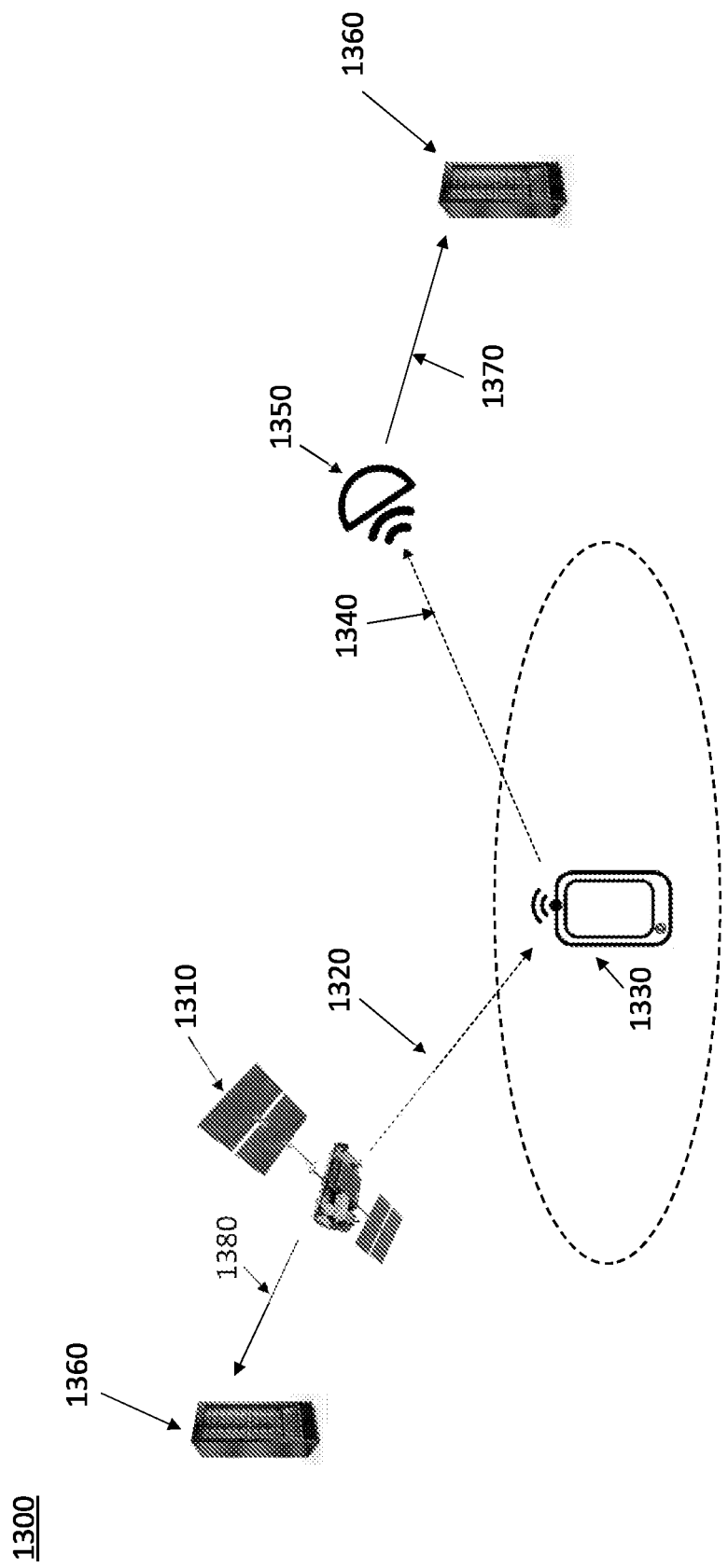
FIG. 13 is a diagram illustrating an example of the disclosed system for a low CSWAP geolocation capability that utilizes signal characteristics passed through to a backhaul network, where the system may be employed for verifying the location of a beacon for security and/or regulatory purposes, in accordance with at least one embodiment of the present disclosure.

FIG. 13 is a diagram illustrating an example of the disclosed system 1300 for a low CSWAP geolocation capability that utilizes signal characteristics passed through to a backhaul network, where the system 1300 may be employed for verifying the location of a beacon 1330 (e.g., a transceiver) for security and/or regulatory purposes, in accordance with at least one embodiment of the present disclosure. The system 1300 of FIG. 13 is similar to (and operates similarly to) the system 100 of FIG. 1, where both systems 1300, 100 may comprise a single originating transmitter (e.g., originating transmitter 110 of FIG. 1, and originating transmitter 1310 of FIG. 11), a single beacon device (e.g., beacon device 130 of FIG. 1, and beacon device 1330 of FIG. 13), and a single monitoring receiver (e.g., monitoring receiver 150 of FIG. 1, and monitoring receiver 1350 of FIG. 13).

In particular, the system 1300 of FIG. 13 includes a beacon device 1330 associated with a device (e.g., in the form of a smart phone) that may be associated with a user. In one or more embodiments, the beacon device 1330 may be associated with various different types of devices that may be associated with a user including, but not limited to, a smart phone, a computing device, a smart watch, virtual reality glasses, and/or a vehicle.

In at least one embodiment, the system 1300 may determine the location of the beacon device 1330 to verify and/or authenticate the user associated with the device (e.g., smart phone) that is associated with the beacon device 1330. In one or more embodiments, at least one processing facility (e.g., processing facility 1360) of the system 1300 may verify and/or authenticate the user based on the location of the user for security and/or regulatory purposes, which may include, but are not limited to, secure mobile voting, a Transportation Security Administration (TSA) check, a background check, a security profile, and/or tracking of protected persons. In some embodiments, for example, at least one processing facility (e.g., processing facility 1360) of the system 1300 may verify and/or authenticate the user based on the location of the user for a background check, for example for an online dating website, to be able to identify a potential catfish.

In FIG. 13, the system 1300 is shown to include four types of hardware components, which may include a single beacon device 1330 (e.g., a first device), a single originating transmitter 1310 (e.g., a second device), a single monitoring receiver 1350 (e.g., a third device), and processing facility 1360, which may include at least one processor and/or at least one computer server. Each of these types of hardware components (e.g., the beacon device 1330, the originating transmitter 1310, the monitoring receiver 1350, and the processing facility 1360) may include a transceiver, which can include both a receiver configured to receive EM signals, such as RF signals, wirelessly and/or via wire, and a transmitter configured to transmit EM signals, such as RF signals, wirelessly and/or via wire. It should be noted that although the system 1300 is shown in FIG. 13 to include two separate processing facilities 1360, the system 1300 may only include one processing facility 1360.

In one or more embodiments, the system 1300 may include multiple of each of the four types of hardware components (e.g., the beacon device 1330, originating transmitter 1310, monitoring receiver 1350, and processing facility 1360). In some embodiments, for example, the system 1300 of FIG. 13 may include hundreds of originating transmitters 1310, beacons 1330, monitoring receivers 1350, and/or processing facilities 1360. Additionally, in one or more embodiments, these hardware components (e.g., the beacon device 1330, originating transmitter 1310, monitoring receiver 1350, and processing facility 1360) can operate in a number of different environments (e.g., a space, air, terrestrial, and/or marine, such as ocean, environment).

In one or more embodiments, the originating transmitter 1310 and/or the monitoring receiver 1350 may be associated with a satellite, which may be a LEO, MEO, and/or Geosynchronous Earth Orbit (GEO) satellite (e.g., a geostationary satellite). In some embodiments, the originating transmitter 1310 and/or the monitoring receiver 1350 may be associated with a satellite within a NE-GNSS constellation. In one or more embodiments, the originating transmitter 1310 and/or monitoring receiver 1350 may be on a space-based platform, an airborne platform, a sea-based platform, and/or a terrestrial platform. In one or more embodiments, the processing facility 1360 may be a building (e.g., an operation center), which may include at least one computing device, such as a computer server.

The system 1300 is shown in FIG. 13 to also include four communications paths, which may include a communication path for the transmission of a signal 1320 (e.g., an original signal) from the originating transmitter 1310 to the beacon device 1330, a communication path for the transmission of a signal 1380 from the originating transmitter 1310 to the processing facility 1360, a communication path for the transmission of the signal 1340 (e.g., a beacon signal) from the beacon device 1330 to the monitoring receiver 1350, and a communication path for the transmission of the signal 1370 from the monitoring receiver 1350 to the processing facility 1360. In one or more embodiments, the signals 1320, 1380, 1340, and/or 1370 are EM signals (e.g., RF signals). In some embodiments, the signals 1320, 1380, 1340, and/or 1370 may each be in the form of a burst signal, which may contain data packets. In one or more embodiments, the signals 1320, 1340, 1380, and/or 1370 may be transmitted wirelessly and/or via wire.

During operation of the system 1300 of FIG. 13, the originating transmitter 1310 may generate and transmit (e.g., wirelessly) a signal 1320 (e.g., an original signal) towards the beacon device 1330. Then, the beacon device 1330 may receive the signal 1320 (e.g., the original signal) transmitted from the originating transmitter 1310.

After the beacon device 1330 has received the signal 1320 (e.g., the original signal) transmitted from the originating transmitter 1310, the beacon device 1330 may determine (e.g., measure) estimated signal properties of the received signal 1320 (e.g., the original signal). The beacon device 1330 may then generate a signal 1340 (e.g., a beacon signal) based on the estimated signal properties of the received signal 1320 (e.g., the original signal). After the beacon device 1330 has generated the signal 1340 (e.g., the beacon signals), the beacon device 1330 may transmit the signals 1340 (e.g., the beacon signal) towards the monitoring receiver 1350. After the beacon device 1330 has transmitted the signal 1340 (e.g., the beacon signal), the monitoring receiver 1350 may receive the signal 1340 (e.g., the beacon signal) from the beacon device 1330.

After the monitoring receiver 1350 has received the signal 1340 (e.g., the beacon signal) transmitted from the beacon device 1330, the monitoring receiver 1350 may determine (e.g., measure) estimated signal properties of the received signal 1340 (e.g., the beacon signal). Then, the monitoring receiver 1350 may generate a signal 1370 based on the estimated signal properties of the received signal 1340 (e.g., the beacon signal). After the monitoring receiver 1350 has generated the signal 1370, the monitoring receiver 1350 may transmit the signal 1370 towards the processing facility 1360 for processing to determine the location of the beacon device 1330. It should be noted that, in some embodiments, the monitoring receiver 1350 itself may perform processing to determine the location of the beacon device 1330.

Also during operation of the system 1300 of FIG. 13, after the processing facility 1360 has determined the location of the beacon device 1330 associated with the device (e.g., smart phone) associated with the user, the processing facility 1360 may compare the determined location of the beacon device 1330 to locations contained within a listing of verified locations for the user. It should be noted that, the listing of verified locations for the user may contain at least one verified location for the user. If the processing facility 1360 determines that the determined location of the beacon device 1330 matches a verified location for the user contained within the listing of verified locations for the user, the processing facility 1360 may verify and/or authorize the user. However, if the processing facility 1360 determines that the determined location of the beacon device 1330 does not match a verified location for the user contained within the listing of verified locations for the user, the processing facility 1360 may not verify and/or authorize the user, and may identify the user as an unauthorized individual and/or a spoofer.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more."

What is claimed is:

1. A method for determining a location of a first device, the method comprising:
   receiving, by the first device, at least one first signal comprising first signal properties from at least one second device;
   determining, by the first device, estimated first signal properties of the at least one first signal by measuring the first signal properties of the at least one first signal, wherein the estimated first signal properties comprise time of arrival (TOA) of the at least one first signal;
   generating, by the first device, at least one second signal, which comprises second signal properties, based on at least a portion of the estimated first signal properties; and
   transmitting, by the first device, the at least one second signal to at least one third device,
   wherein estimated second signal properties of the at least one second signal are determined by the at least one third device measuring the second signal properties of the at least one second signal, and
   wherein the location of the first device is determined by utilizing at least a portion of the estimated second signal properties.

2. The method of claim 1, wherein the location of the first device is determined by further utilizing a time of transmission of each of the at least one first signal, and utilizing a location and velocity of each of the at least one second device at the time of transmission of the at least one first signal.

3. The method of claim 1, wherein at least one of the at least one first signal or the at least one second signal is a burst signal.

4. The method of claim 1, wherein at least one of the at least one first signal or the at least one second signal comprises a unique identifying signature.

5. The method of claim 4, wherein the unique identifying signature is encoded in data of at least one of the at least one first signal or the at least one second signal.

6. The method of claim 1, wherein the estimated first signal properties of the at least one first signal further comprise at least one of a center frequency, a modulation, a signal power, a signal quality, a Doppler, or a unique identifying property.

7. The method of claim 1, wherein the estimated second signal properties of the at least one second signal comprise at least one of a center frequency, a frequency offset, a modulation, a time of arrival (TOA), a time offset, a signal power, a signal quality, a Doppler, a unique identifying property, a location of the at least one third device at the TOA corresponding to the at least one third device, or a velocity of the at least one third device at the TOA corresponding to the at least one third device.

8. The method of claim 1, wherein at least one of at least one entity or at least one of the at least one third device determines the location of the first device.

9. The method of claim 8, wherein the method further comprises receiving, by the first device, the location of the first device from at least one of the at least one entity or at least one of the at least one third device.

10. The method of claim 1, wherein at least some successive pairs of corresponding data of the at least a portion of the estimated second signal properties are utilized to determine the location of the first device.

11. The method of claim 1, wherein the first device is associated with at least one of a consumer device, user equipment, a smart watch, a smart phone, a mobile phone, virtual reality glasses, a military-grade device, a computing device, an Internet of Things (IoT) device, a computer, a laptop, a tablet, a server, a vehicle, a vehicle tied device, a navigation device, a tracking device, an asset tracking device, a drone, heavy equipment, field equipment, mining equipment, shipping equipment, a device to monitor individuals, a device to track individuals, a supply chain management device, a regulatory device, an autonomous vehicle, an autonomous robot, a device for monitoring people, a secure voting device, a Transportation Security Administration (TSA) checking device, a background checking device, a security profiling device, a device track protected persons, an aircraft, an airplane, a high altitude balloon, a rail device, a train, a last mile delivery component, an industrial device, a mining device, a manufacturing device, a robotic device, a marine vehicle, a boat, a marine device, a buoy, a computing security device, infrastructure, a base station, a space junk tracking devices, smart infrastructure, or a smart traffic control device.

12. The method of claim 1, wherein each of the at least one second device and each of the at least one third device is one of a space device, an airborne device, a terrestrial device, a marine device, or an Internet of Things (IoT) device.

13. The method of claim 12, wherein the terrestrial device is associated with at least one of a base station, an item of inventory, infrastructure, a building, a vehicle, an autonomous vehicle, a train, a robot, smart infrastructure, a smart traffic control device, a consumer device, user equipment, a smart watch, a smart phone, a mobile phone, virtual reality glasses, a computing device, a computer, a laptop, a tablet, or a server.

14. The method of claim 12, wherein the marine device is associated with at least one of a boat or a buoy.

15. The method of claim 12, wherein the space device is associated with at least one of a satellite or a space junk tracking device.

16. The method of claim 15, wherein the satellite is a low earth orbit (LEO) satellite, a medium earth orbit (MEO) satellite, or a geosynchronous earth orbit (GEO) satellite.

17. The method of claim 16, wherein the GEO satellite is a geostationary satellite.

18. The method of claim 15, wherein the satellite is within a satellite constellation.

19. The method of claim 15, wherein when there are at least two of the satellites, the satellites are low earth orbit (LEO) satellites, medium earth orbit (MEO) satellites, geosynchronous earth orbit (GEO) satellites, or a combination thereof.

20. The method of claim 15, wherein when there are at least two of the satellites, the satellites are within one or more satellite constellations.

21. The method of claim 12, wherein the airborne device is associated with at least one of an airplane, an aircraft, a drone, or a high altitude balloon.

22. The method of claim 1, wherein the first device transmits each of the at least one second signal at a time equal to a time of arrival (TOA) of a corresponding one of the at least one first signal with an additional time offset.

23. The method of claim 1, wherein the first device transmits the at least one second signal at a frequency equal to a nominal frequency of a corresponding one of the at least one first signal with an additional Doppler offset.

24. A method for determining a location of a first device, the method comprising:
   generating, by at least one second device, at least one first signal comprising first signal properties; and
   transmitting, by the at least one second device, the at least one first signal to the first device,
   wherein estimated first signal properties of the at least one first signal are determined by the first device by measuring the first signal properties of the at least one first signal, wherein the estimated first signal properties comprise time of arrival (TOA) of the at least one first signal, wherein at least one second signal, which comprises second signal properties, is generated by the first device based on at least a portion of the estimated first signal properties, wherein the at least one second signal is transmitted by the first device to at least one third device, wherein estimated second signal properties of the at least one second signal are determined by the at least one third device by measuring the second signal properties of the at least one second signal, and wherein the location of the first device is determined by utilizing at least a portion of the estimated second signal properties.

25. The method of claim 24, wherein the location of the first device is determined by further utilizing a time of transmission of each of the at least one first signal, and utilizing a location and velocity of each of the at least one second device at the time of transmission of the at least one first signal.

26. The method of claim 24, wherein at least one of the at least one first signal or the at least one second signal is a burst signal.

27. The method of claim 24, wherein at least one of the at least one first signal or the at least one second signal comprises a unique identifying signature.

28. The method of claim 27, wherein the unique identifying signature is encoded in data of at least one of the at least one first signal or the at least one second signal.

29. The method of claim 24, wherein the estimated first signal properties of the at least one first signal further comprise at least one of a center frequency, a modulation, a signal power, a signal quality, a Doppler, or a unique identifying property.

30. The method of claim 24, wherein the estimated second signal properties of the at least one second signal comprise at least one of a center frequency, a frequency offset, a modulation, a time of arrival (TOA), a time offset, a signal power, a signal quality, a Doppler, a unique identifying property, a location of the at least one third device at the TOA corresponding to the at least one third device, or a velocity of the at least one third device at the TOA corresponding to the at least one third device.

31. The method of claim 24, wherein at least one of at least one entity or at least one of the at least one third device determines the location of the first device.

32. The method of claim 31, wherein the method further comprises receiving, by the first device, the location of the first device from at least one of the at least one entity or at least one of the at least one third device.

33. The method of claim 24, wherein the first device is associated with at least one of a consumer device, user equipment, a smart watch, a smart phone, a mobile phone, virtual reality glasses, a military-grade device, an Internet of Things (IoT) device, a computing device, a computer, a laptop, a tablet, a server, a vehicle, a vehicle tied device, a navigation device, a tracking device, an asset tracking device, a drone, heavy equipment, field equipment, mining equipment, shipping equipment, a device to monitor individuals, a device to track individuals, a supply chain management device, a regulatory device, an autonomous vehicle, an autonomous robot, a device for monitoring people, a secure voting device, a Transportation Security Administration (TSA) checking device, a background checking device, a security profiling device, a device track protected persons, an aircraft, an airplane, a high altitude balloon, a rail device, a train, a last mile delivery component, an industrial device, a mining device, a manufacturing device, a robotic device, a marine vehicle, a boat, a marine device, a buoy, a computing security device, infrastructure, a base station, a space junk tracking devices, smart infrastructure, or a smart traffic control device.

34. The method of claim 24, wherein each of the at least one second device and each of the at least one third device is one of a space device, an airborne device, a terrestrial device, a marine device, or an Internet of Things (IoT) device.

35. A method for determining a location of a first device, the method comprising:
   receiving, by at least one third device, at least one second signal, which comprises second signal properties, from the first device; and
   determining, by the at least one third device, estimated second signal properties of the at least one second signal by measuring the second signal properties of the at least one second signal, wherein estimated first signal properties of at least one first signal, which comprises first signal properties, received by the first device are determined by the first device by measuring the first signal properties of the at least one first signal, wherein the estimated first signal properties comprise time of arrival (TOA) of the at least one first signal, wherein the at least one second signal is generated by the first device based on at least a portion of the estimated first signal properties, and wherein the location of the first device is determined by utilizing at least a portion of the estimated second signal properties.

36. The method of claim 35, wherein the location of the first device is determined by further utilizing a time of transmission of each of the at least one first signal and utilizing a location and velocity of each of the at least one second device at the time of transmission of the at least one first signal.

37. The method of claim 35, wherein the method further comprises generating, by the at least one third device, at least one third signal based on at least a portion of the estimated second signal properties.

38. The method of claim 37, wherein the method further comprises transmitting, by the at least one third device, the at least one third signal to at least one entity.

39. The method of claim 38, wherein the at least one entity determines the location of the first device.

40. The method of claim 39, wherein the location of the first device is received by the first device from the at least one entity.

41. The method of claim 35, wherein the method further comprises determining, by at least one of the at least one third device, the location of the first device.

42. The method of claim 41, wherein the method further comprises transmitting, by at least one of the at least one third device, the location of the first device to the first device.

* * * * *